(12) United States Patent
Tsao et al.

(10) Patent No.: US 12,083,740 B2
(45) Date of Patent: Sep. 10, 2024

(54) FLEXIBLE 3D FREEFORM TECHNIQUES

(71) Applicant: National Tsing Hua University, Hsinchu (TW)

(72) Inventors: Che-Chih Tsao, Hsinchu (TW); Cheng-Chi Chen, New Taipei (TW)

(73) Assignee: National Tsing Hua University, Hsinchu (TW)

( * ) Notice: Subject to any disclaimer, the term of this patent is extended or adjusted under 35 U.S.C. 154(b) by 890 days.

(21) Appl. No.: 16/985,293

(22) Filed: Aug. 5, 2020

(65) Prior Publication Data

US 2020/0361145 A1 Nov. 19, 2020

Related U.S. Application Data

(63) Continuation-in-part of application No. 14/953,030, filed on Nov. 27, 2015, now Pat. No. 10,766,802.

(Continued)

(51) Int. Cl.
| | |
|---|---|
| *B29C 64/165* | (2017.01) |
| *B23K 9/04* | (2006.01) |
| *B29C 64/209* | (2017.01) |
| *B29C 64/232* | (2017.01) |
| *B29C 64/241* | (2017.01) |

(Continued)

(52) U.S. Cl.
CPC .......... *B29C 64/165* (2017.08); *B23K 9/044* (2013.01); *B29C 64/209* (2017.08); *B29C 64/232* (2017.08); *B29C 64/241* (2017.08); *B29C 64/264* (2017.08); *B29C 64/295* (2017.08); *B29C 64/393* (2017.08); *B22F 10/18* (2021.01); *B22F 10/22* (2021.01); *B22F 10/85* (2021.01); *B22F 12/53* (2021.01); *B22F 12/57* (2021.01); *B29L 2031/082* (2013.01);

(Continued)

(58) Field of Classification Search
CPC ... B29C 64/165; B29C 64/264; B29C 64/232; B29C 64/295; B29C 64/209; B29C 64/241; B29C 64/118; B29C 64/393; B33Y 10/00; B33Y 30/00; B33Y 50/02; B23K 9/044; B29L 2031/082; B22F 10/85; B22F 10/18; B22F 10/22; B22F 12/53; B22F 12/57
USPC ........................................................ 425/375
See application file for complete search history.

(56) References Cited

U.S. PATENT DOCUMENTS

| | | | | |
|---|---|---|---|---|
| 6,030,199 A | * | 2/2000 | Tseng ...................... | B28B 1/001 425/375 |
| 2016/0046073 A1 | * | 2/2016 | Hadas ................... | B29C 48/301 425/382.2 |

(Continued)

*Primary Examiner* — Nahida Sultana
*Assistant Examiner* — Lawrence D. Hohenbrink, Jr.

(57) ABSTRACT

This invention relates to processes and systems of rapid prototyping and production. Its features includes flexible material deposition along tangential directions of surfaces of a part to be made, thereby eliminating stair-shape surface due to uniform horizontal layer deposition, increasing width of material deposition to increase build up rate, applying the principles of traditional forming/joining processes, such as casting, fusion welding, plastic extrusion and injection molding in the fabrication process so that various industrial materials can be processed, applying comparatively low cost heating sources, such as induction heating and arc-heating. Additional features include varying width and size of material deposition in accordance with geometry to be formed and applying a differential molding means for improved shape formation and surface finishing.

13 Claims, 15 Drawing Sheets

(a)

(b)

Related U.S. Application Data

(60) Provisional application No. 62/085,509, filed on Nov. 29, 2014.

(51) Int. Cl.
| | |
|---|---|
| *B29C 64/264* | (2017.01) |
| *B29C 64/295* | (2017.01) |
| *B29C 64/393* | (2017.01) |
| *B22F 10/18* | (2021.01) |
| *B22F 10/22* | (2021.01) |
| *B22F 10/85* | (2021.01) |
| *B22F 12/53* | (2021.01) |
| *B22F 12/57* | (2021.01) |
| *B29L 31/08* | (2006.01) |
| *B33Y 10/00* | (2015.01) |
| *B33Y 30/00* | (2015.01) |
| *B33Y 50/02* | (2015.01) |

(52) U.S. Cl.
CPC ............... *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2016/0151833 A1* | 6/2016 | Tsao | B23K 9/04 219/136 |
| 2019/0151990 A1* | 5/2019 | Mezawa | B23K 26/0876 |
| 2020/0207017 A1* | 7/2020 | Yuwaki | B29C 64/106 |

* cited by examiner (a) Prior art  (b) Prior Art (a)  (b)

(a)  (b)

(a)  (b)

(a)  (b)

(a)

(b)

(a)　　　　　(b)　　　　　(c)

(d)　　　　　(e)　　　　　(f)

(a)          (b)

(a)　　　　　　　　　　　　　(b)

FLEXIBLE 3D FREEFORM TECHNIQUES

CROSS-REFERENCE TO RELATED APPLICATIONS AND OTHER DOCUMENTS

This application is a Continuation in Part of Ser. No. 14/953,030 filed Nov. 27, 2015 by Che-Chih Tsao, which claims the benefit of U.S. Provisional Patent Application No. 62/085,509 filed on Nov. 29, 2014. All the above are incorporated by reference in their entirety.

BACKGROUND

This invention relates to systems and methods of rapid prototyping and production (or called additive manufacturing or 3D printing). Especially, this invention relates to fabricating 3D prototypes, articles, components and molds at improved surface finish and increased speed.

Existing major rapid prototyping (also known as additive manufacturing or 3D printing) techniques include methods such as SLM (Selective Laser Melting) for making metal parts (for examples, EOS M400, referring to http://www.eosinfo/systems_solutions/metal/systems_equipment/eos_m_400, 3D Systems SPro 250, see http://production3dprinters.com/sites/production3dprinters.com/files/downloads/sPro-125-250-SLM-Direct-Metal.pdf, or Renishaw AM250, referring to http://www.renishaw.com/en/am250-laser-melting-machine-15253)), and SLA ((Stereolithography) (for example, 3D Systems ProJet HD 7000, referring to http://printin3d.com/sites/printin3d.com/files/downloads/ProJet-6000-7000-USEN.pdf), FDM (Fused Deposition Modeling) (e.g. Stratasys FDM 900m, referring to http://www.fortus.com/Products/Fortus-900mc.aspx) and 3DP (3D Printing) (jetting binders to powder bed layer-by-layer) for making plastic parts.

In general, these existing rapid prototyping methods apply a layer-by-layer construction methodology. Materials are dispensed in horizontal layers and within each layer joined by point scanning. Material build-up by horizontal layers, regardless of the 3D shape to be built, creates inevitable layered (stairs-like) surface feature, resulting in poor surface finish. Material joining by point scanning is basically "scanning a 3D body by one tiny point", resulting in slow build-up rate. Combined operation of layer dispensing and point-scanning joining slows down the process further. FIG. 1 illustrates an example 3D part. FIG. 2 illustrates the fabrication of this example 3D part by the existing methodology. FIG. 2(a) shows the blade portion and FIG. 2(b) shows the cross-sectional view. Dotted lines 201 indicate the grid structure of horizontal layers and solid curves 203 indicate trajectories of point scanning. Stairs-like surface features at 214 and 212 are inevitable.

When using the SLM technique to make a mold for plastic injection molding, the surface finish can be about 40 um Ra and a machining tolerance of 200~500 um is generally required, which makes post machining cost significant. There are studies on post polishing using laser beams. (Referring to Lamikiz et al., "Laser polishing of parts built up by selective laser sintering", International Journal of Machine Tools & Manufacture 47 (2007) 2040-2050). In order to improve forming speed, a so called "skin-core strategy" was developed, which uses a laser of small focal spot to scan edges of patterns in each layer and a larger focal spot to scan the interior. (Referring to (1) K. Wissenbach, "Fantasia Project Shows Selective Laser Melting Can Produce Complex Components Quickly and Cost Effectively", http://www.ineffableisland.com/2010/05/fantasia-project-shows-selective-laser.html?showComment=1318241730096; (2) C. Hinke, "Direct, Mould-less Production Systems", http://www.production-research.de/C12577F20052BDC7.nsf/html/de_040d66b2c812b739c1257829005207de.html). But these methods also increase equipment costs.

In the FDM technique, U.S. Pat. No. 5,121,329 by Crump, which is incorporated herein for this current application by reference, describes methods of moving a material dispensing nozzle along curved trajectories in 3D to produce curved surfaces or frames and of dispensing materials of variable thickness by changing material feed rate (referring to FIG. 10 and FIG. 12 of that patent). Page in US Pat. App. Pub. No. 2015/0266244 A1 also describes methods of moving a material dispensing head along curved trajectories in 3D to produce curved surfaces, while changing material flow rate. However, because the FDM method generally uses a nozzle of fixed orifice size to dispense material, as in the cases of the above two references, the effect of speed increasing is likely to be limited. In general, FDM nozzle orifice sizes are from 0.25 to 1.0 mm (referring to www.matterhackers.com/news/3d-printer-nozzle-comparison-guide). The width of a dispensed filament is comparable to the size of the nozzle orifice. As a result, dispensing speed cannot be increased significantly and variation of width of dispensed filament is very limited. In another FDM related technique, U.S. Pat. No. 8,221,669, which is incorporated herein for this current application by reference, describes the use of ribbon (non-cylindrical) filament as material, in contrast to the cylindrical filament used in most current commercial systems, in order to reduce the so called "response time", that is, the delay time from the start or stop of the feeding mechanism to the actual flow rate change at the tip of the extrusion tip of the liquefier. But it should be noted that faster material deposition is not the purpose nor mentioned in this patent.

There have been attempts to develop variable size nozzles to increase building speed. Brooks et al. (Referring to H. Brooks et al., "Variable fused deposition modelling—concept design and tool path generation", in *Rapid Design, Prototyping and Manufacturing*, pp. 113-122. ISBN 978-0-9566643-1-0, from eprints.lancs.ac.uk/50959/) discussed a conceptual design of a two-stage FDM nozzle with a compound structure to provide two different but switchable nozzle diameters. However, these attempts were still based on the conventional layer-by-layer method. In another work, Tseng and Tanaka in U.S. Pat. No. 6,030,199 described a planar dispensing slit of variable size, featuring two movable and partially overlapped slots to control slit opening size. However, this technique still builds up an object one planar layer after another and does not deal with the stairs-like issue. Further, the planar dispensing slit has a large maximal width covering the full working area and basically moves only in one axis to dispense material in maximal width possible in order to maximize build rate in one layer. As a result, such a large dispensing head is generally not suitable for traveling along curved trajectories in 3D.

There are other methods developed or under development for making metal objects. For example, applying the FDM technique to make metal parts has been attempted. U.S. Pat. No. 7,942,987, which is incorporated herein for this current application by reference, describes a method of heating a metal alloy to a temperature between a solidus temperature and a liquidus temperature to obtain a semi-solid metal alloy with enough viscosity so that it can be extruded. However, the "point scanning" and "layer by layer" issues are not addressed in this approach.

Another approach is called Laser Deposition Technology (LDT) or Laser Engineered Net Shape (LENS). Metal powder is injected into a focused beam of a high-power laser under tightly controlled atmospheric conditions. The focused laser beam melts the surface of the target material and generates a small molten pool of base material. Powder delivered into this same spot is absorbed into the melt pool, thus generating a deposit. By moving the laser beam and the deposition relative to the target material, 3D shapes can be built up. A description of the process can be found from http://www.rpm-innovations.com/laser_deposition_technology and related technical details can be seen in U.S. Pat. Nos. 4,323,756 and 5,043,548, which are incorporated herein by reference. A very similar method, except using wire metal instead of powder, was described in U.S. Pat. No. 5,578,227, which is incorporated herein by reference. In general, these approaches are basically still a "point scanning" based approach. Further, surfaces of built-up parts are usually rough.

SUMMARY

The basic principle of the Flexible 3D Freeform technique is to dispense a solidifiable material in a fluid state from a dispensing head onto a base member to build up the material, which solidifies under preset ambient conditions, in a basically continuous fashion according to a predetermined relative movement sequence between the dispensing head and the base member. Based on this principle, this invention comprises a feature of dispensing the solidifiable material along the tangential directions of the surface of the 3D article to be fabricated so that the layered surface feature in existing rapid prototyping processes is eliminated and the surface finish is improved. This invention also comprises a feature of enlarged width of dispensed materials and a corresponding new 3D forming procedure so that fabrication speed can be increased significantly. For these purposes, this invention includes a motion mechanism of multiple degrees of freedom to provide the required relative movement sequence between the dispensing head and the base member. Further, this invention includes a feature of adjusting the width, thickness and flow speed of the dispensed material according to needs from local geometry of a 3D article during the dispensing process. The dispensing head dispenses material in a few basic shapes including ribbon (band), wire and dot. When the geometry of the 3D object to be fabricated allows, wide, ribbon-shaped material can be dispensed so that building speed can be increased. Dispensed materials of wire- and dot-shapes can be applied to build up fine and complex features. Still further, this invention includes a differential molding means, which applies a solid or fluid means in contact with selected positions on dispensed material while it is solidifying, to restrict the flow of and to shape the solidifying material. By this means, good surface finish can be obtained. Curvature in the direction along the width of a ribbon-shaped dispensed material can also be made by this means.

A variation of this invention is to dispense a joinable material in particulate form and simultaneously apply a joining means to the material dispensed at the target area such that the dispensed particulate material starts to join into an integral material.

Another variation of this invention includes a dispensing head capable of dispensing material from two connected but perpendicular exits, one for dispensing material in erected positions and one for dispensing material in horizontal positions. In general, the dispensing head of this invention comprises adjustable exit capable of changing cross-sectional area by a factor of at least 10 to 200 to accommodate variation of required geometric feature size and to increase build rate. Further, this invention includes a shaping tool for reshaping solidified dispensed material to improve curvature and surface finish. Still further, this invention includes a Thick-layer Building procedure, which builds a 3D object by repeatedly alternating a dispensing step to dispense a thick layer of material and a shaping step, using a shaping tool, to reshape the layer.

DETAILED DESCRIPTION

Figure 1:
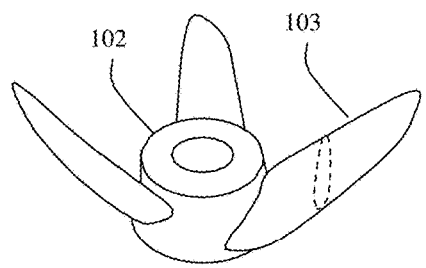
FIG. 1 depicts an example of 3D article.
Figure 2:
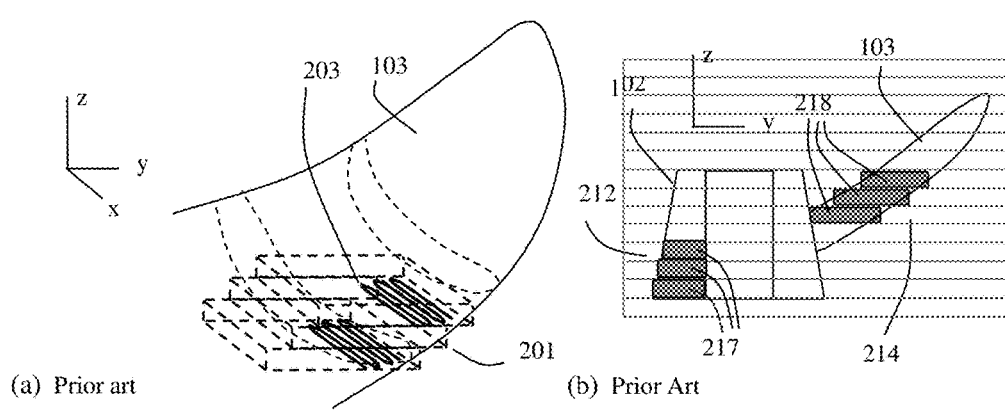
FIG. 2 illustrates the layer-by-layer construction methodology used in the prior arts.
Figure 3:
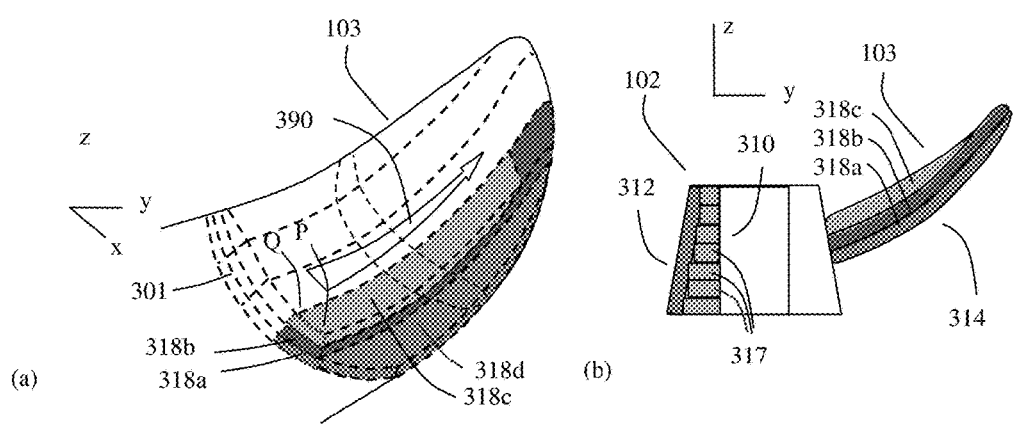
FIG. 3 explains the basic concept of this invention using the 3D object depicted in FIG. 1 as an example.

FIG. 3 explains the basic concept of the invention using the 3D object depicted in FIG. 1 as an example. When making the hub 102, materials can be dispensed in horizontal layers and built up vertically, as shown by 310 of FIG. 3(b), similar to 212 of FIG. 1(b), because the inner wall of the hub is vertical. However, when making the outer wall, the preferred material dispensing direction is along the tangential direction of the wall, so that stair-like features can be eliminated and good surface finish can be obtained (312). Especially, when making the blades 103, dispensing materials along the tangential direction of the curved blade geometry can improve surface finish very significantly (FIG. 3(b) 314). In FIG. 3(a), dotted-lines 301 depict the grid structure using this Flexible 3D Freeform technique. The grid structure has 3 layers stacked together and each layer is distributed along the tangential direction of the curved blade geometry. Materials dispensed according to the grid structure are shown as 318a, 318b and 318c.

Figure 4:
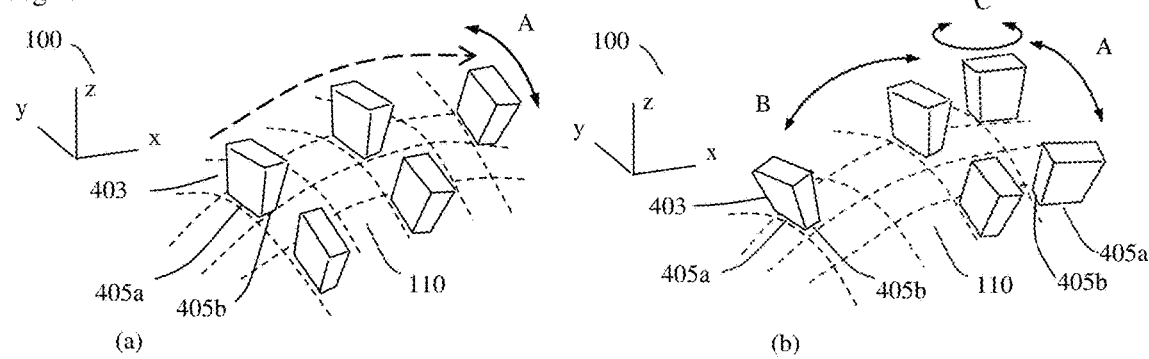
FIG. 4 illustrates the spatial relationship between a material dispensing head of this invention and an example 3D surface.

Moving the dispensing head to trace arbitrary 3D surfaces relative to the base member requires a mechanism of multiple degrees of freedoms. In general, if the exit of the material dispensing head is just a single orifice, close to a spot or a point in geometry, then a motion means of 3 degree-of-freedom (DOF) is enough to allow a section of an arbitrary 3D surface to be traced by a point spot. However, if dispensing of wide band-shaped material is preferred, then a motion means of at least 4 DOF is preferred. FIG. 4(a) illustrates the situation. The exit of the material dispensing head 403 has a long (width) edge 405a and a short edge 405b. In order to dispense material at maximal width, the dispensing head must move and trace the 3D surface 110 in a direction perpendicular to the edge 405a. In order to accommodate the change of surface curvature perpendicular to the motion direction (which is x-direction in FIG. 4), one rotational DOF (A-axis, which rotates about x-direction) is needed. That is, the system has 3 independent linear DOFs (x, y, z) and one rotary DOF (A). A more preferred arrangement applies 3 independent linear DOFs (x, y, z) and 2 rotary DOF (A and B, which rotates about y-direction). This is illustrated in FIG. 4(b). The addition of B DOF allows the dispensing head to always maintain a fixed angle with respect to the target area. A still more preferred arrangement is to add a third rotary DOF C, which rotates about z-direction. This allows the dispensing head to move in basically any direction with maximal dispensing width, or with any reduced dispensing width, which will be further described in later texts.

Figure 5:
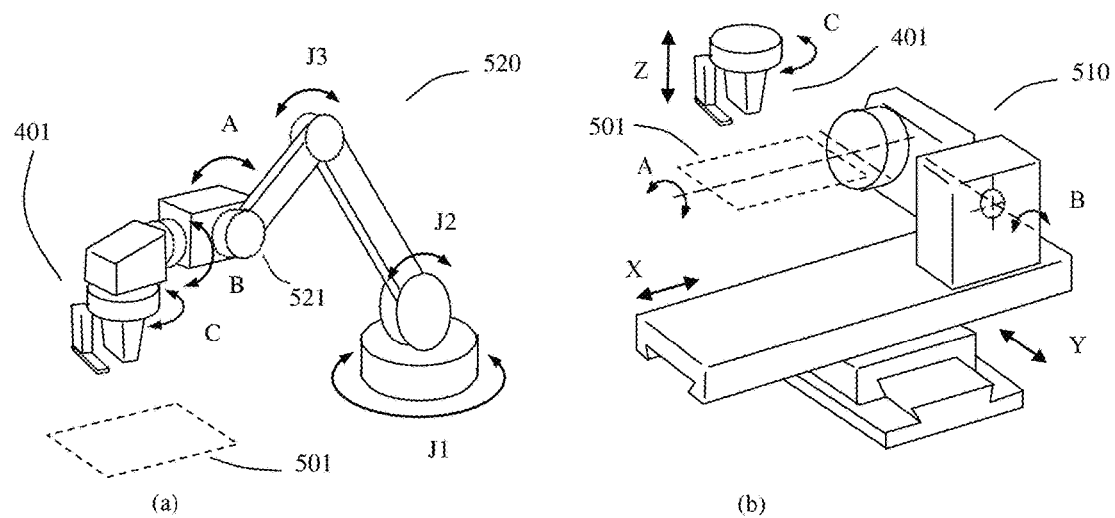
FIG. 5 illustrates two examples of mechanisms to provide the required relative movements between the material dispensing head and the base in this invention.

There are many options of mechanisms to provide the required relative movements between the material dispensing head and the base. FIG. 5(a) illustrates one example, which is basically in a robotic arm configuration 520. The rotations at 3 joints, J1, J2 and J3, can place the end 521 of the robotic arm to basically any position (x, y, z) relative the base area 501, whereas A, B and C 3 axes can rotate the material dispensing system 401 to any orientation. FIG. 5(b) illustrates another example, which is basically a 5-DOF (5-axis) mechanism comprising 3 linear DOFs (X, Y, Z) and 2 rotational DOFs (A about X-axis and B about Y-axis). The base area 501, carrying the base and the 3D article to be fabricated on the base, is attached to the A-axis rotary stage. The material dispensing system is attached to the Z-stage. The dispensing head can rotate about the Z-axis, forming the 6th DOF (C-axis). Other configurations and variations can be made by people skilled in the arts based on the teaching of this current document.

Further, this invention includes the feature of adjusting width and thickness of the dispensed material according to needs from local geometric characteristics of a 3D article during the dispensing process. The dispensing head dispenses material in a few basic shapes including ribbon (band), wire and dot. When the geometry of the 3D object to be fabricated allows, wide, ribbon-shaped material can be dispensed so that building speed can be increased. If geometric features to be built are small and fine, then the width and thickness of the dispensed material can be reduced to dispense wires and dots accommodate the situation.

For example, FIG. 6(a) depicts a 3D thin-shell surface comprising 5 ribbon-shaped materials joined together (368a-e). 350 indicates the cross-sectional curve of an ideal smooth 3D curved surface. The curvature on one side (350a) is larger than that on the other side (350b). When this surface is fabricated using the current invention, the side with smaller curvature can be made by dispensing and joining wider ribbon materials, such as 368d and 368e, whereas the side with larger curvature requires ribbon materials of smaller width, such as 368a and 368b. Wider ribbons correspond to faster build rate, which speeds up the whole fabrication process. Accordingly, this feature allows maximization of material dispensing rate based on local geometry.

There are at least 2 methods to adjust width and thickness of dispensed materials. The first method adjusts the orientation of the dispensing head together with the material flow rate to change size of cross-sections of dispensed materials. The second method applies a dispensing head with an adjustable exit. Details will be described in later texts.

Still further, this invention includes a differential molding means, which applies a solid or fluid means in contact with selected positions on dispensed material while it is solidifying, to restrict the flow of and to shape the solidifying material. By this means, good surface finish can be obtained. A further variation of this means can create curvature in the direction along the width of a ribbon-shaped dispensed material, in order to match curvatures of local geometries. For example, in the 3D thin-shell surface depicted in FIG. 6(a), if the ribbon-shaped dispensed materials have rectangular cross-section, as illustrated as 3681, then the fabricated surface will not completely match the ideal cross-sectional curve 350. However, as illustrated in FIG. 6(b), if the dispensed ribbon-shaped material can be made to have curvature along its width direction, then every band (367a-e) can be made to match the local curvature of the ideal cross-sectional curve 350, and the fabricated object will have 3D curvatures closely matching the ideal smooth 3D curved surface.

Differential molding by solid means applies a small solid surface (called "differential mold") in contact with selected portions of the dispensed material while it is solidifying, to restrict the flow of and to shape the solidifying material. This solid means further comprises mechanisms to change curvature in the width direction of the dispensed solidifying material. Differential molding by fluid means applies different pressures generated from fluid flows to achieve similar effects. Details are to be described in later texts.

Combining a motion mechanism capable of multiple-DOF flexible 3D paths, a material dispensing head that can adjust the size of dispensed material, and a differential molding means that can shape curvature of the dispensed material in the width direction, fast fabrication of 3D curved surface can be realized. As illustrated in FIG. 3(a) and FIG. 3(b), each of the ribbon-shaped structures depicted by different tones of gray (318a, 318b, 318c, and 318d) represent one band of ribbon-shaped material dispensed by the dispensing head in a single pass. For example, the light gray band structure 318c is formed by a dispensing motion that basically sweeps a curve PQ along the direction of arrow 390. This maximizes material deposition rate.

Accordingly, this invention includes the following procedure of fabricating a 3D article:

(1) Analyze the geometric shape and the requirements (such as surface finish, material forming direction or strength requirements etc.) of different portions of the 3D article and make a process plan. This process plan divides the geometric data of the 3D article into a number of zones and sets an order of sequence of fabrication of these zones.

(2) Based on the process plan, disassemble the geometric data of the 3D article and generate a collection of Component Geometries that can be recombined to form the shape of the 3D article. The so-called Component Geometries include geometric volumes of bands (ribbons), wires (lines) and dots (points). Further identify and select zones that require good surface finish and then disassemble and convert these selected zones into collections of band and wire Component Geometries.

(3) For each Component Geometry generated in step (2), determine a corresponding set of forming parameters (including thickness, width, curvature and dispensing trajectory).

(4) For each set of forming parameters generated in step (3), determine a set of process parameters, including material feed rate, ambient conditions (such as temperature), material dispensing rate, dispensing head speed etc.

(5) Following the sequence determined in the process plan, dispensing material to form each Component Geometry. The forming method for each Component Geometry is to move the material dispensing system (including the dispensing head and the differential molding means) along the dispensing trajectory, relatively, and dispense solidifiable material according to the corresponding set of forming parameters.

By forming each Component Geometry in sequence, all the Component Geometries combine to form the 3D article.

Under proper situations, the dispensing head capable of adjusting exit size and the differential molding means for curvature formation do not need to be applied together. For example, the 3D thin-shell curved surface of FIG. 6(a) can be fabricated without using the differential molding means for curvature formation.

In the broadest sense, the solidifiable material of this invention includes any material that has a fluid state and can be converted into a solid state under specific environmental conditions.

For example, many polymers exhibit the property. Most thermoplastics exhibit fluid state at elevated temperatures and solidify at lower temperatures. Typical examples include Nylon, PMMA and polystyrene (PS) such as ABS etc. Wax is another material that exhibits the property depending on temperature. Wax is another material that exhibits the solidifiable property based on temperature.

Polymer materials can be dispensed by extruding, which corresponds to plastics extrusion processes in traditional bulk plastic processes, or by jetting (injection from fluid state), which corresponds to injection molding.

Photo-curable polymers, such as photoresist and liquid photo-lithographical polymer used in the SLA process, can also be used. In this case, the environmental condition that solidifies the polymers is mainly exposure of light, especially UV light.

The solidifiable materials can be metals, which exhibit the solidifiable property based on temperature. In analogy to traditional bulk processes, such as casting, continuous casting and fusion welding, molten metal can be dispensed from a dispensing head, such as a tundish with a nozzle, and then be allowed to cool down and solidify. Molten metals, especially those of lower melting points, can also be dispensed by injection, in analogy to metal injections applied in die casting. Another method to dispense molten metal is to shoot metal droplets.

Another form of solidifiable materials includes pastes, that is, the mixture of fine solid particles and a liquid state carrier. For example, in the prior art of the process of metal injection molding, metal particles are mixed with a fluid carrier made of polymer and wax at an elevated temperature. This mixture is then injected into a mold and cooled down and becomes a solid. The wax and the polymer are then removed in a melting and burning process, leaving a green part composed of metal powder, which is then sintered. In the current invention, a similar mixture of metal powder with wax and polymer in fluid state at elevated temperature can be used as the solidifiable material and temperature can be used as the main control of environmental condition. Solid parts can be dispensed by extrusion or by injection and be built up in the manner described previously. The same processes of wax/polymer removal and sintering can then be applied to make the final solid metal parts.

Another example of paste includes ceramic slurry, which is basically a mixture of fine ceramic powder with water and binders. The mixture can be dispensed and built up in the manner described previously. Depending on the fluidity and viscosity of the mixture, the material can be dispensed either by jetting (injection), if the fluidity is high and viscosity is low, or by extrusion, if the fluidity is low and the viscosity is high. Simultaneously with the dispensing, a flow of heated air can be applied to the dispensed material at the target zone to quicken the drying process. A green part can thus be formed. The green part can then be sintered into a solid ceramic part.

Still another example of paste is concrete.

Another form of solidifible material is glass. It can be extruded and temperature can be used as the main environmental control to solidify it.

A variation of this invention is to dispense a joinable material in particulate form and simultaneously apply a joining means to the material dispensed at the target area such that the dispensed particulate material starts to join into an integral material. For example, metal or plastic powders can be used as the particulate joinable materials and a localized heating, which can be provided by a laser or an electric arc, can be used as the joining means. The dispensed powder is partially or fully melted by the localized heating and then, when out of the localized heat, cools down and re-solidifies into an integral part. For another example, a separate localized dispensing of binder material to the dispensed powder can be used as the joining means. Various binder materials used in processes such metal powder injection molding or ceramic powder molding can be used to join metal and ceramic powders.

A system of this invention includes a material dispensing head, a motion mechanism of multiple-DOF, which can generate flexible 3D paths between the dispensing head and the base, a material supply system that can control material feed rate and an ambient condition control system. It can further include a differential molding means that can shape curvature of the dispensed material in the width direction. The processing method includes the process plan mentioned previously, the process of disassembling geometric data, the process of generating the forming parameters and processing parameters, as well as the procedure of controlling the operation of the material dispensing head and the differential molding means, and the procedure of controlling the multi-DOF motion mechanism. Examples of embodiment of the invention are further described below.

EXAMPLE 1: MOLTEN METAL AS SOLIDIFIABLE MATERIAL, 3D FREEFORM BY A CASTING-BASED MEANS 1.1 The Material Dispensing System FIG. 7(a) illustrates an example embodiment of a material dispensing system for metal, which includes a material supply unit 402, a dispensing head 403 and an optional differential molding means 420. FIG. 7(b)-(c) illustrates its cross-sectional views from side. The material supply unit 402, which includes a heating means (such as induction heating or electric arc heating) and a material feeding means (a metal wire powder can be used), sends the material into the dispensing head 403. The dispensing head includes a material cell 404 with an exit 405 at the lower end for dispensing material and a material inlet opening 406 at top for receiving material supply from the material supply unit. A heating means outside of the material cell keeps the metal in molten state 480. A material not reactive to the molten metal is preferred for making the material cell. For example, aluminum oxide, graphite or other high temperature ceramics can be used to contain molten steel. Ceramics can also be used for metals of high melting points, such as titanium, cobalt, chromium and nickel alloys. Steel cells can be used to contain molten copper; aluminum can be used for molten tin; whereas molten aluminum can use titanium, titanium coated with boron nitride, or steel coated with nitralloy. The molten metal can flow out of the exit under the effect of gravity. Alternatively, a gas pressure from the top of the material cell can push the molten metal out of the exit. The actual size of the material cell and the exit depends on size of the 3D article to make, dimensional tolerance and materials.

Figure 8:
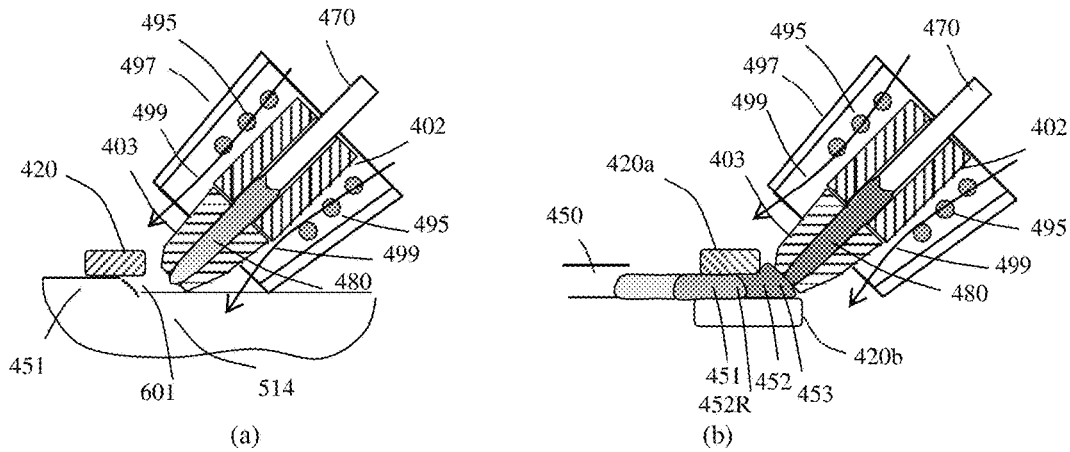
FIG. 8 illustrates another example of the material supply unit in cross-sectional view, using an induction heating means to melt a metal wire, and operation of the differential molding means in this invention.

FIG. 8 illustrates a different example of the material supply unit 402 in cross-sectional view, wherein an induction heating means 495 melts a metal wire 470. The solid metal wire 470 is fed from rear end and can push and retract the molten metal 480 at the front like a piston. The material supply unit, the dispensing head 403, and the heating means are packed inside a casing 497 and an inert gas 499, such as argon or $CO_2$, blows through the casing to cover the whole system including the material dispensing and solidification area to prevent oxidation of metal.

Figure 7:
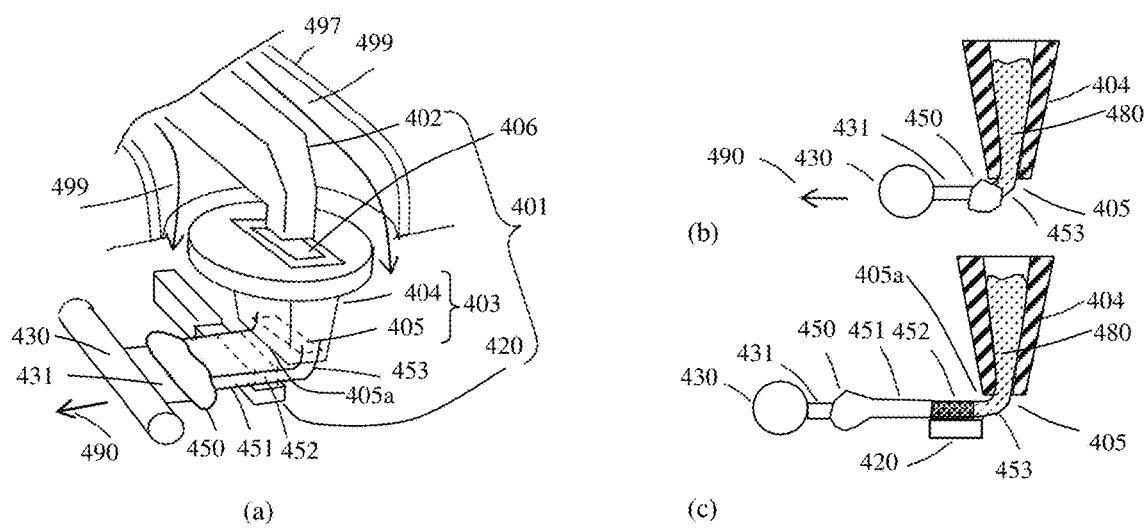

As the molten metal flows out of the exit, it forms a droplet attached to the outside of the exit due to surface tension. By touching the droplet with the base (or solidified material on the base), the temperature of the droplet decreases due to thermal conduction and solidification starts. FIG. 7 and FIG. 8(b) depict the initial stage of the material dispensing process, the metal droplet touches a metal plate 431, which is attached to the base (metal frame 430) and is used as a starting point of the forming process. The base 430 together with the starting metal plate 431 then act as a heat sink and the metal droplet starts to solidify from the contact position 450 at the starting metal plate. The ambient condition control unit (not shown) controls the temperatures of the base and the starting metal plate within a proper range and the heating means around the material dispensing head 403 sets the temperature of the molten metal at an elevated, proper range. When the base with the starting metal plate moves along the direction indicated by arrow 490, the metal can be dispensed, formed and solidified in a manner similar to continuous casting. Metal 453 close to the exit of the dispensing head is in molten state. A little away from the exit, there is a short solidification zone 452 wherein the molten metal solidifies. Further away from the exit and the solidification zone, solidified metal forms a band-shaped solid 451, which extends to the initial solidification point 450. Because of the effect of surface tension, as long as the temperatures and the speeds of motion and material supply are properly controlled, molten metal will flow out of the exit and follow the solidification path without dripping down. In the situation shown in FIG. 8(a), molten metal is dispensed onto the surface of previously dispensed and solidified metal 514, which also becomes a part of the heat sink.

1.2 Motion System

Figure 13:
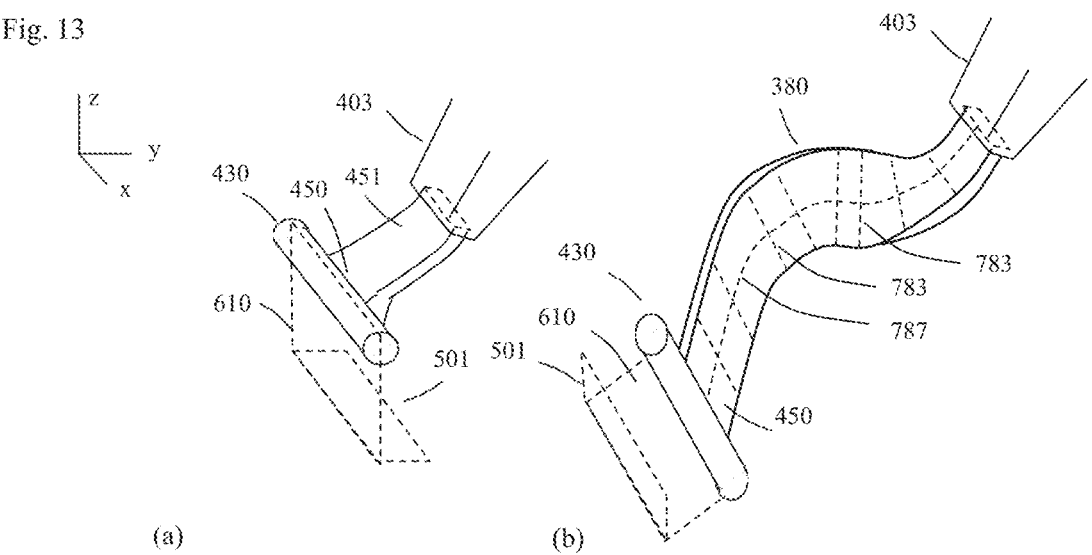
FIG. 13 illustrates forming of an arbitrarily twisted ribbon shape by relative motions between the base and the dispensing head in this invention.

A motion system with multiple degrees of freedom is used to provide relative motion between the material dispensing head and a base member. This part has been described in previous sections related to FIG. 4 and FIG. 5. For example, as shown in FIG. 13, the base member (metal frame 430) is attached to a structure 610 on the base 501 of a motion system. By relative motions between the base and the dispensing head 403, a surface of arbitrarily twisted shape 380 can be made.

Figure 9:
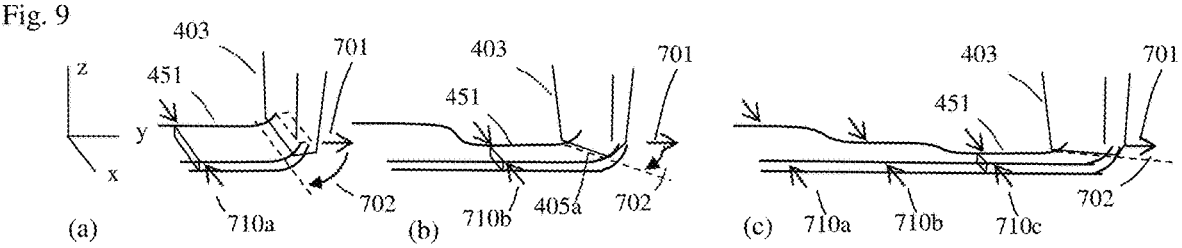
FIG. 9 illustrates an example method of adjusting cross-sectional size of dispensed material during dispensing by adjusting dispensing head orientation in this invention.

1.3 Systems and Methods for Adjusting Cross-Sectional Size of Dispensed Material The first preferred method of adjusting cross-sectional size of dispensed material during dispensing is to adjust the angle of the dispensing head relative to the track of dispensing motion and adjust material flow rate. As depicted in FIG. 9, changing the angle 702 of the leading edge 405*a* of the exit of the dispensing head relative to the motion direction of dispensing 701, with matched adjustment of material flow rate, band-shaped materials of the same thickness but different widths can be dispensed, as illustrates at 710*a*, 710*b* and 710*c*. Depicted in FIG. 10, reorient the dispensing head and changing the angle 703 of the leading edge 405*a* relative to the vertical direction, with matched adjustment of material flow rate, vertical wall-shaped materials of the same thickness but different heights can be dispensed, as illustrated at 711*a*, 711*b* and 711*c*.

Figure 11:
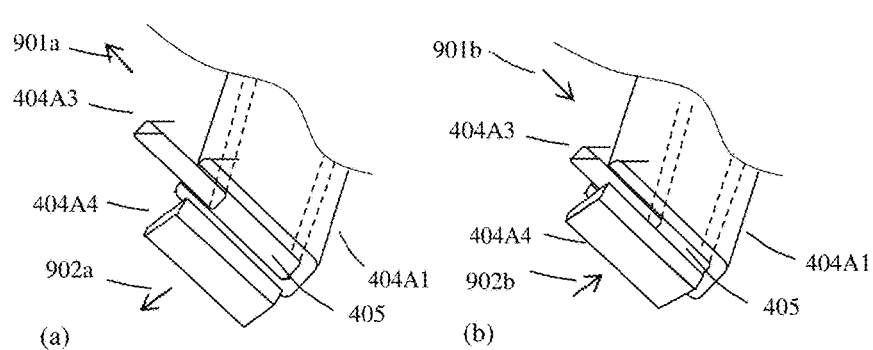
FIG. 11 illustrates an example approach of adjusting cross-sectional size of dispensed material during dispensing by adjusting dimension of the exit of the dispensing head in this invention.

The second preferred method of adjusting cross-sectional size of dispensed material during dispensing is to use a gating mechanism to adjust the dimension of the exit of the dispensing head. FIG. 11 depicts one example design of the material dispensing head with adjustable exit size. The material-containing cell 404 in this design includes 3 main parts: a U-shaped main body 404A1, a side-slab 404A3 that inserts into and slides in the main body and an exit lip 404A4 that slides over the exit 405. (Restraining structures and bearings of the sliding mechanisms are not shown.) Pulling the slide slab along arrow 901*a* increases the length of the exit 405 and moving the exit lip along arrow 902*a* opens the exit to the maximal size, as illustrated in FIG. 11(*a*). Pushing the slide slab along arrow 901*b* decreases the length of the exit 405 and moving the exit lip along arrow 902*a* reduces the exit to the minimal size, as illustrated in FIG. 11(*b*).

Figure 12:
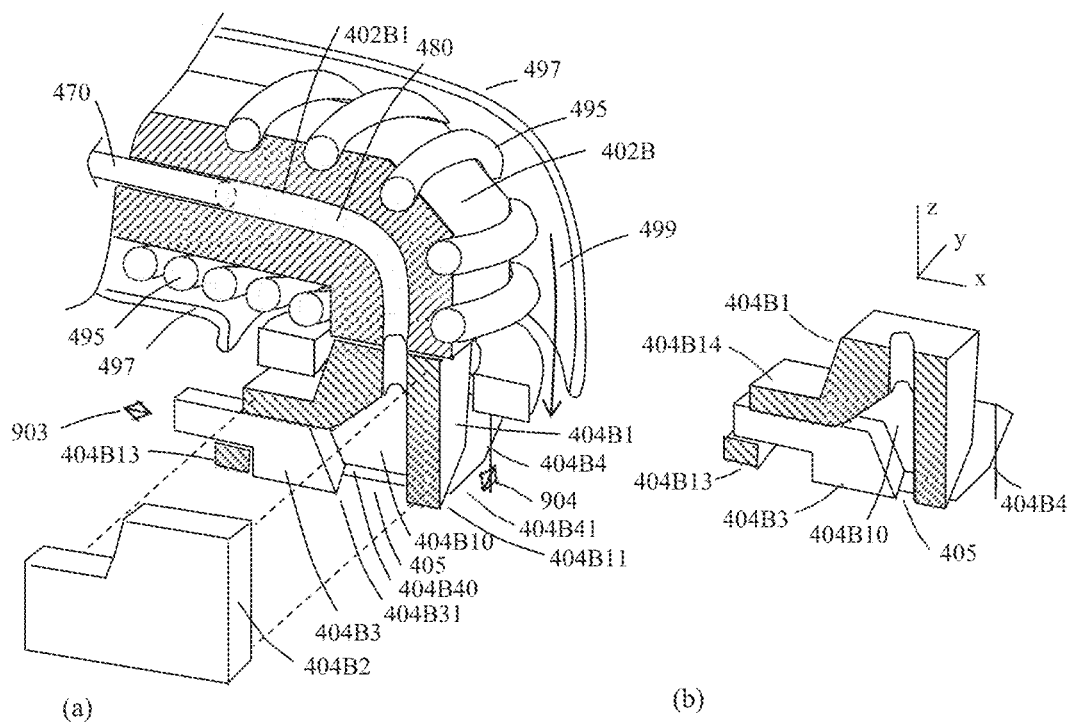
FIG. 12 illustrates another example approach of adjusting cross-sectional size of dispensed material during dispensing by adjusting dimension of the exit of the dispensing head in this invention.

FIG. 12(*a*) depicts, in exploded view, another example design of the material dispensing head with adjustable exit size. The material-containing cell 404 in this design includes 4 main parts: a main body 404B1, a side-slab 404B3, a cover 404B2 that covers the main cell space 404B10 and the side-slab, and an exit lip 404B4 that slides over the exit 405. The side lab is basically restrained on 5 surfaces by the cover, the main body, two restraining structures 404B13 and 404B14 of the main body and the tip edge of the exit lip at 404B40. Therefore, the side slab can slide linearly along arrow 903. Restraining structures for the lip 404B4 can be of a similar design and is not shown. Similar to the design of FIG. 11, the exit 405 is also opened and closed by the sliding motions of the slide slab 404B3 and the lip 404B4. When the slide slab is pushed to the right along arrow 903 and the lip is pushed down along arrow 904, the exit is closed down, as shown in FIG. 12(*b*). Near the exit 405, the tip edges of the main body, the side slab and the lip are shaped into wedge-shapes, as depicted at 404B11, 404B31 and 404B41. This way, the exit opening 405 can always be kept at the lowest position of the assembly of the dispensing head. The possibility of mechanical interference or collision between parts of the dispensing head and the solidified workpiece can be minimized.

The designs illustrated in FIG. 11 and FIG. 12 basically apply the principle of adjusting the area of the exit 405 from two different directions (specifically, perpendicular directions) by two independently adjusted gating members. This way allows the exit opening to be smoothly adjusted between a large maximal size and a very small minimal size.

Figure 27:
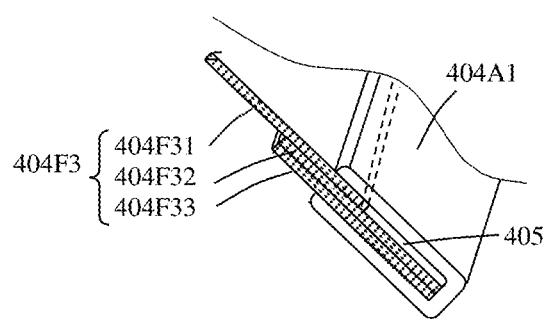
FIG. 27 illustrates still another example approach of adjusting cross-sectional size of dispensed material during dispensing by adjusting dimension of the exit of the dispensing head in this invention.

FIG. 27 depicts another example design of the material dispensing head with adjustable exit size. Compared to FIG. 11, this design uses multiple side-slabs stacked together 404F3, without an exit lip. By moving and positioning each side-slab (404F31, 404F32 or 404F33) independently, the size of the exit 405 can be adjusted discretely in thickness direction but continuously in width direction. As depicted in FIG. 27, closing and opening one side-slab along its corresponding exit slot changes the opening area of the slot by several times. For example, if the slot is 1 mm wide and maximal opening is 5 mm, then adjusting one side-slab in one slot can adjust the area of material dispensing exit from at least 1 mm$^2$ to 5 mm$^2$. Applying 3 side-slabs can therefore change exit area from 1 mm$^2$ to 15 mm$^2$.

Figure 28:
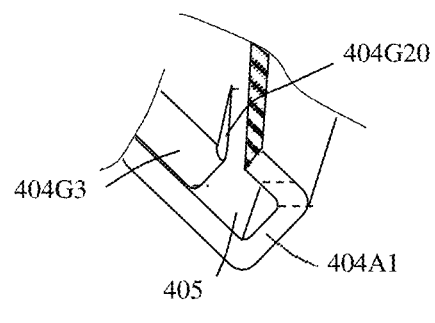
FIG. 28 illustrates still another example approach of adjusting cross-sectional size of dispensed material during dispensing by adjusting dimension of the exit of the dispensing head in this invention.
Figure 28:
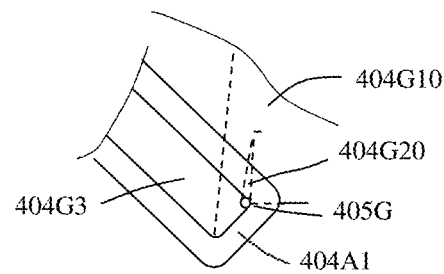

FIG. 28 depicts another example design of the material dispensing head. It uses a single side-slab 404G3 that has a recess feature 404G20 on its leading edge. When the slab is positioned to fully-closed position, this recess feature and the inside wall of the main body 404A1 form a nozzle structure with the cell space 404G10 at back and the orifice 405G at the exit face, for dispensing materials in wire-and filament-shapes. Assuming the recess feature 404G20 has a diameter of 0.25 mm, comparable to small orifice size of existing FDM nozzle, and the exit is 2 mm wide by 5 mm long when the slab is fully open, then the ratio of the maximal cross-sectional area to the minimal is 200 to 1.

The contacting surfaces between the main body and the side-slab (or the lip) need to have two functions: bearing function for sliding motion and sealing function for preventing liquid metal from leaking out. The bearing material can include graphite, ceramics such as aluminum oxide, silicon nitride, silicon carbide. Cast iron, brass, Nitralloy and Zerodur can also be used if the solidifiable material used is a non-ferrous metal.

For non-wetting sliding surfaces, surface tension of the molten metal will basically prevent itself from seeping into the sliding interfaces. Further, the material feeding involves a pressure only slightly above normal atmospheric pressure. Therefore, leaking is generally not a major concern.

1.4 Differential Molding Means

The material dispensing system can further include a differential molding means, which applies a small solid means (called differential mold) in contact with selected positions on dispensed material while it is solidifying, to restrict the flow of and to shape the solidifying material to obtain desired cross-sectional shape. By this means, good surface finish can be obtained. Curvature in the direction along the width of a ribbon-shaped dispensed material can also be made by this means.

As depicted in FIG. 7, by placing a small solid surface 420 underneath the solidification zone 452, this solid surface together with the leading edge of the exit 405*a* forms restrictions on both sides of the dispensed material so that the dispensed material solidifies into a band (ribbon) shape. The differential mold 420 can also be applied to the top side of the solidification zone to make the top surface of the dispensed material smooth. FIG. 8(*a*) illustrates this situation. Part of the surface of the differential mold 420 touches previously solidified material at 451, a small cavity 601 is formed by the remaining part of the differential mold surface together with restricting surfaces of previously dispensed and solidified materials at 451 and 514. The dispensing head dispenses material to fill this cavity. The newly dispensed material solidifies. Then the differential mold and the dispensing head move to the right to begin the next dispensing step. FIG. 8(*b*) illustrates the situation when two differential molds are applied to opposite sides of dispensed material. Upper differential mold 420*a* and lower differential mold 420*b* together with previously solidified material 451 form a small cavity for receiving dispensed molten metal 452. In principle, in order to have good bonding between newly dispensed material and previously solidified material, a small portion of the previously dispensed material needs to be re-melted and then re-solidified together with the newly dispensed material, as indicated by 452R. By moving the upper and the lower differential molds together with the dispensing head, long, band-shaped solid can be formed.

Figure 6:
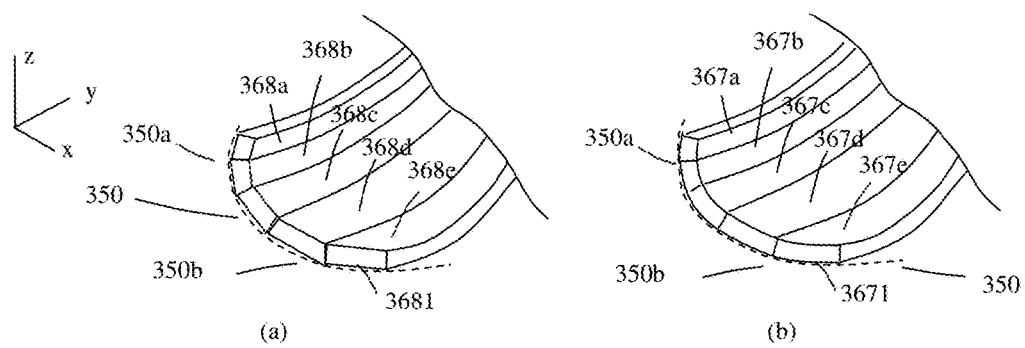
FIG. 6 depicts two methods to form a 3D thin-shell surface from joining ribbon-shaped materials together by this invention FIG. 7($a$) illustrates an example embodiment of a material dispensing system for metal in this invention; ($b$)-($c$) illustrates its cross-sectional views from side.
Figure 14:
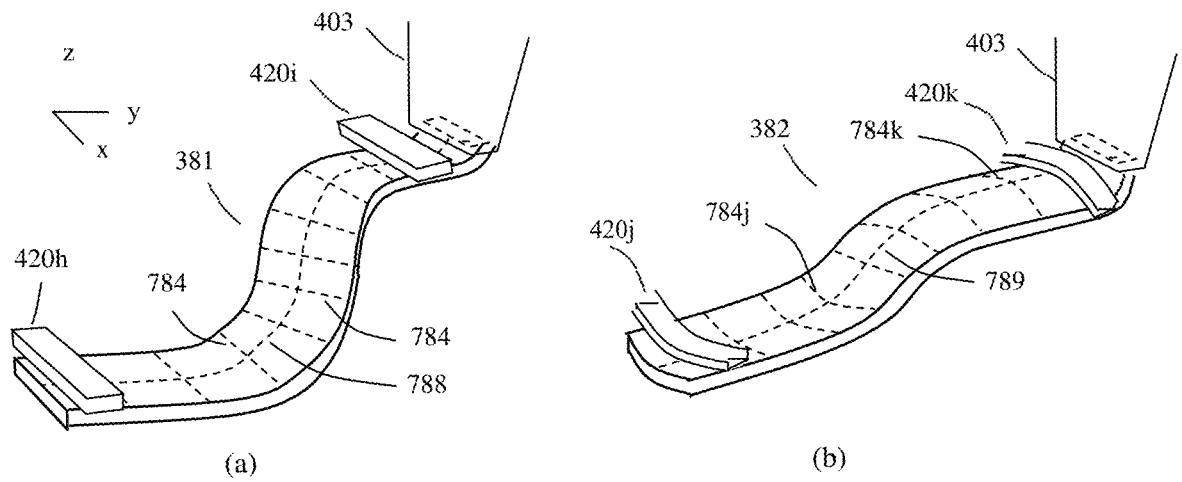
FIG. 14 illustrates examples of operation of the differential molding means in this invention.

In general, the longitudinal direction of the differential mold is parallel to the solidification front of the melt and perpendicular to the track of the dispensing. Therefore, when a flat surface is used as the differential mold, a solid band (or ribbon) can be formed and the surface of the band in its transverse (width) direction is flat. This is illustrated in FIG. 14(*a*). Curved band 381 is formed by moving a differential mold from location 420*h*, together with the operating dispensing head 403, to location 420*i*. The track of dispensing is indicated by the dashed curve 788, which is generated by the multi-DOF motion mechanism. In the transverse (width) direction, indicated by dash lines 784, the surface of the band is flat (straight line). Such bands can still be joined to approximate a 3D curved surface, as shown in FIG. 6(*a*).

If the differential mold is made to be able to change its curvature along its length direction, then band-shaped geometry having curvature in its traverse (width) direction can be formed. As illustrated in FIG. 14(*b*), curved band 382 is formed by moving a differential mold from location 420*j*, together with the operating dispensing head 403, to location 420*k*. The track of dispensing is indicated by the dashed curve 789. In the transverse (width) direction, as illustrated, initially the differential mold is made to curve upward 420*j* so the surface has a positive curvature (or bending upward) as indicated by dash lines 784*j*. In the later stage of dispensing, the differential mold is made to curve downward 420*k* so the surface has a negative curvature (or bending downward) as indicated by dash lines 784*k*. As a result, combining this curvature capable differential mold with the multi-DOF motion mechanism, band-shaped geometry with curvatures in both directions (along the dispensing track as well as its transverse (width) direction) can be formed. 3D surfaces of almost arbitrary curvature can be formed by joining bands with variable curvature in both directions, as illustrated in FIG. 6(*b*). In FIGS. 14(*a*) and (*b*), the differential molds are depicted on top of the dispensed material stripes (381, 382). They can also be under the dispensed material or on both the top and the underside of the dispensed material, depending on situations and needs, as described in previous paragraphs.

It should be noted that the so called "minute size" of the differential mold is measured relative to the size of the object to be fabricated, rather than by an absolute standard.

Figure 15:
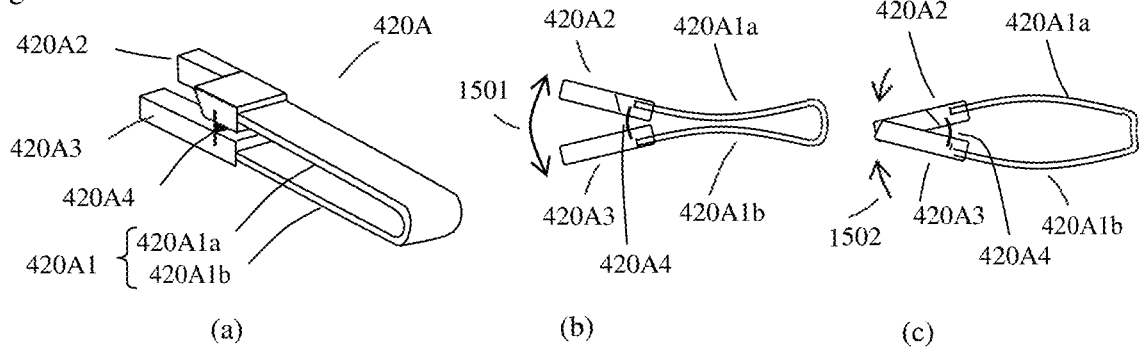
FIG. 15 illustrates an example design of the differential molding means based on material deformation in this invention.

The differential mold that can change curvature along its longitudinal direction can be constructed by at least two approaches. The first approach applies a deformable member and an actuation means that changes the curvature of the member. FIG. 15 depicts one example by this method, which mainly comprises two bendable foils. These two deformable foils can be the two parts (420A1*a*, 420A1*b*) of a single U-shaped foil 420A1, as shown in FIG. 15(*a*). Two handles (420A2, 420A3) are attached to the separate ends of the two foils and are connected at a pivot 420A4. When a force opens the handles, as illustrated in FIG. 15(*b*) at 1501, both foils bends inward and become concave. When a force closes the handles, as illustrated in FIG. 15(*c*) at 1502, both foils bend outward and become convex. The curvature of the foil surfaces can be controlled by adjusting the extent of opening (or closing) of the handles. The open and close of the handles can be actuated by a suitable mechanism such as two co-axial worm gears of opposite spiral directions (not shown). This differential mold can be applied to the top surface of dispensed material by using the lower foil 420A1*b*, or to the underside surface of the dispensed material by using the upper foil 420A1*a*.

Figure 16:
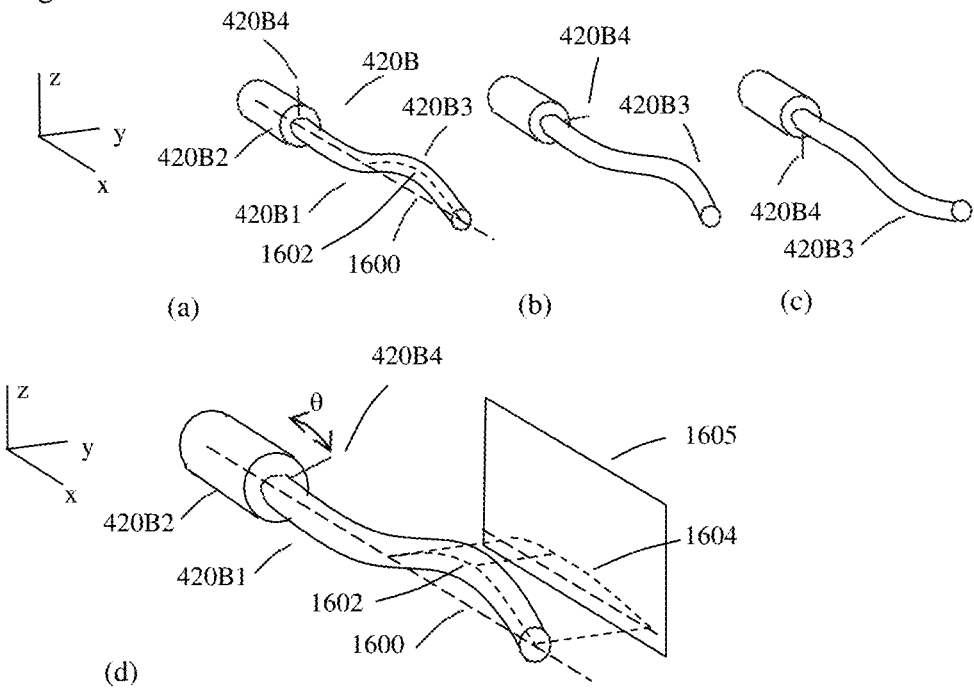
FIG. 16 illustrates another example design of the differential molding means based on non-deformable shapes in this invention.

The second approach uses a curved, non-deformable member and makes use of different portions on the member, each portion having different curvature, to make contact with dispensed material to meet the required curvature. FIG. 16 illustrates one example of this approach, which includes a rotatable curved rod. The curved rod 420B1 is attached to a shaft 420B2, which is rotatable about axis 1600. For convenience of description, axis 1600 is oriented as parallel to the x-direction. The rod has a curved section that deviates away from axis 1600 toward one direction indicated by a marker 420B4, with the largest deviation at 420B3. When a dispensed material passes over the upper surface of the curved section of the rod in transverse direction, i.e. along y-direction, then depending on the orientation of the rod with respect to the rotational axis 1600, the contacting surface between the rod and the underside of the material will have different curvatures.

For example, in FIG. 16(*a*), the marker 420B4 points toward z-direction, indicating that the peak point of the curve 420B3 also points toward z-direction. Thus, the curved section of the rod acts as a differential mold of convex surface to the underside of the material and the curvature is equal to the curvature of the rod's curved section along x-direction. If the rod rotates so that the marker 420B4 points 90 degree away from z-direction, as shown in FIG. 16(*b*), then the peak of the curved section 420B3 points toward y-direction. That is, the curved rod now basically lies flat on a plane parallel to the x-y plane. Its top surface is basically also flat with respect to z-direction. As a result, the rod acts as a differential mold of flat surface to the underside of the material. If the rod rotates so that the marker 420B4 points 180 degree away from z-direction, as shown in FIG. 16(*c*), then the peak of the curved section 420B3 points toward □z direction. The rod acts as a differential mold with a concave surface to the underside of the material. Note that when the angle between the marker 420B4 and the +z direction is 0 or 180 degree, the rod has maximal curvature in the z-direction, convex or concave.

FIG. 16(*d*) depicts a general case when the rod rotates to an angle with respect to z-direction. To a dispensed material passing over the upper surface of the curved section of the rod in transverse direction, i.e. along y-direction, the curvature it experienced can be obtained from the projection of the rod curve 1602 onto the x-z plane 1605, as shown as curve 1604. The angle of rotation thus controls the curvature of the differential mold. The rotation can be actuated through a suitable mechanism such as a rack and pinion system (not shown). This differential mold can be applied to the top surface or to under-surface of the dispensed material.

Figure 17:
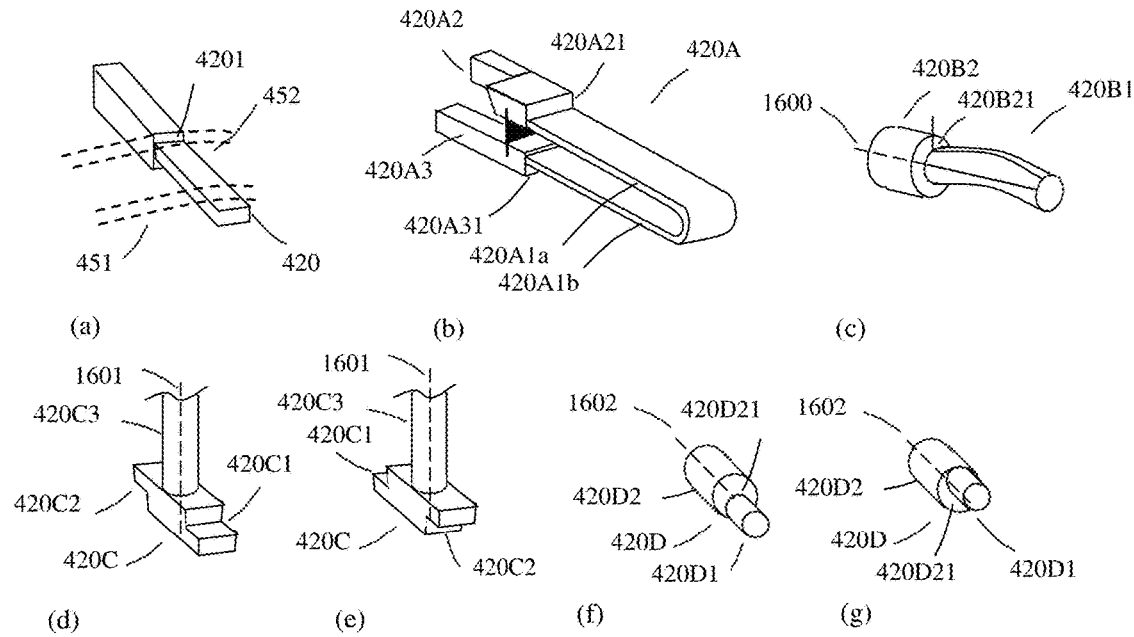
FIG. 17 illustrates an example design of the differential molding means for controlling dimension of width of dispensed material in this invention.

In order to control dimension of width of the dispensed material, the differential mold can include edge shaping features. FIGS. 17(*a*), (*b*) and (*c*) illustrate a few examples of differential molds having a small perpendicular edge (4201, 420A21 or 420B21) relative to the differential molding surface. This small vertical edge 4201 can restrict the material 452 in the width direction during solidification, when the main differential mold surface is on the top of or under the material. When forming thin structures of an object, such as the blades of FIG. 1, the edges can be shaped and trimmed as a final step after the main portion of a blade is formed almost to the final dimension. The edges can then be formed with the help of an edge shaping mold that shapes only the edges but not the main surfaces of the blade. FIG. 17(*d*)-(*e*) illustrates one such example of edge shaping differential mold. The end 420C1 has a step structure that can be applied to the underside of edge of a structure, while the opposite end 420C2 has a similar but upside down step structure, which can be applied to the topside of edge of a structure. By rotating the device about axis 1601, the two opposite ends can be selected as needed. FIG. 17(*f*)-(*g*) illustrates another example of edge shaping differential mold. This example has a short post 420D1 eccentrically attached to a shaft of larger diameter 420D2. The joining area 420D21 forms edge shaping surfaces. Rotation of the shaft 420D2 can place the short post at bottom, as shown in FIG. 17(*f*), or at top, as shown in FIG. 17(*g*), or at any other angle relative to the center axis 1602.

In general, materials used for making the material cell 404 can also be used to make the differential mold, especially those made of non-deformable members. For examples, ceramics, carbon and their composites can be used to make the curved bars of FIGS. 16 and 17. Ceramics can be used for metals of high melting points, such as steels, titanium, cobalt, chromium and nickel alloys. For differential molds based on deformable members, graphite sheets and metals can be used. Steels can be used for molten copper. Steels coated with Nitralloy can be sued for aluminum alloys. Aluminum can be used with tin. For handling molten steels, except graphite, metals of melting point higher than steel may also be used, such as refractory metal tungsten and molybdenum. These metals do form alloys with iron at elevated temperature. To avoid this, the metal surface can be coated with a thin layer of alumina by plasma spray technique, so that the alumina layer shields the metal base from direct contact with the molten steel. In metal coating industry, alumina coated refractory metal foils as thin as 0.01 mm have been used as "alumina coated boats" as evaporation sources. (For example, see products of Megatech of Cannock, Staffordshire, England, http://www.megatechlimited.co.uk/29-alumina-coated-boats). Such a thin foil can also provide the deformability required for curvature adjustment.

Figure 18:
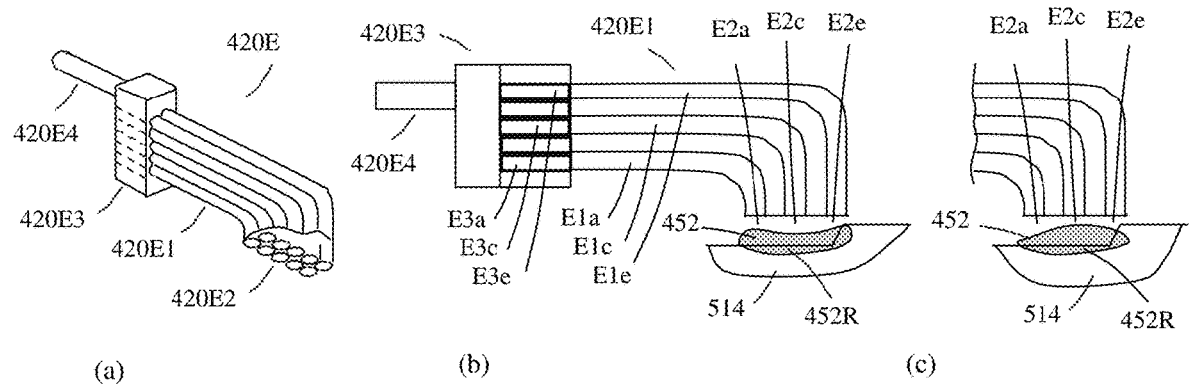
FIG. 18 illustrates another example design of the differential molding means based on fluid flow and pressure in this invention.

The differential mold can also be based on the principle of fluid flow and pressure. The basic concept is to apply multiple channels of gas jets over the dispensed molten metal in the solidification zone and shape the surface of the molten metal by adjusting the flow speeds and pressures of different channels. An example system is depicted in perspective view in FIG. 18(*a*) and in cross-sectional view (sectioned along the width direction of the dispensed material) in FIGS. 18(*b*) and (*c*). The system includes a bundle of small diameter tubing 420E1. The exhaust end of the tubing bundle forms an array of gas outlets 420E2, which is to be placed over the top of the dispensed molten materials in the solidification zone. The inlets end of the tubing connects to a manifold 420E3, which is supplied with an inert gas from inlet piping 420E4. In the manifold, each tube in the bundle is connected to a different controllable flow restricting device. For examples, tube E1*a* is connected to restricting device E3*a*, and tube E1*b* to device E3*b* etc. The flow restricting device can be controlled through a mechanical or electro-mechanical mechanism, such as a piezo-electric actuator, so that the flow rate in the corresponding tube can be adjusted. When the array of gas outlets 420E2 is placed slightly off the top surface of the dispensed molten materials 452 in the solidification zone, the gas flow pushes the metal surface and forms a small gap. A higher flow rate in a tube will result in a higher pressure, and a larger gap, between the corresponding tube outlet and the molten metal surface and a larger gap. A lower flow rate will have a reverse effect. By adjusting different flow restricting devices, different flow rates in different tubes can be generated and different pressures can be provided over different parts of the molten metal surface, thereby shaping its cross-sectional profile. For example, in FIG. 18(*b*), flow rates in the central tubes, such as E1*c*, are higher than those in side tubes, E1*a* and E1*e*, resulting in higher pressure in the middle of the molten metal E2*c*. Thus, the metal surface is pushed down, forming a concave shape. FIG. 18(*c*) illustrates an example of reversed situation, wherein a convex profile is formed by supplying higher flow rate in side tubes, D2*a* and D2*e*, than in central tubes. Argon, $CO_2$ or other inert gas can be used. One advantage of this gas flow system is that the molten metal does not touch the solid part of the differential mold. Therefore, the tubing can be made from various kinds of metals.

When the size of dispensed molten metal is small, the effect of surface tension could surpass the effect of gravity and could cause problem in material dispensing and in the performance of the differential molds. In this case, the solutions include applying a pressure at the upstream of the molten metal (by a gas pressure or by a piston effect such as the one shown in FIG. 12) to "squeeze" the molten metal out and using upper and lower and even edge shaping differential molds simultaneously to confine the molten metal as it solidifies.

Figure 19:
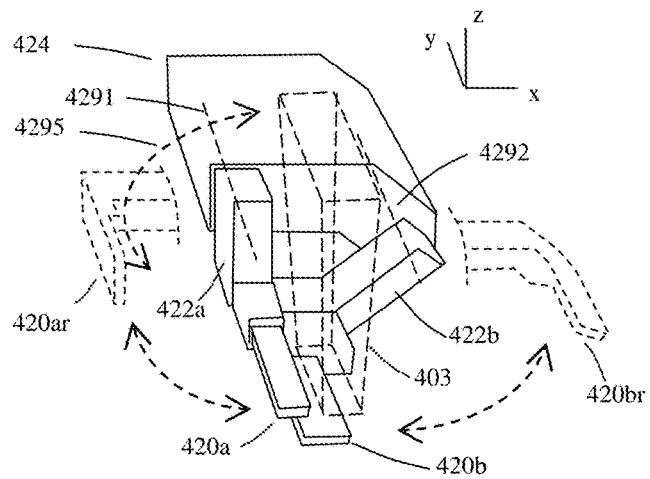
FIG. 19 illustrates an example design of mounting and retracting mechanism of the differential molds system in this invention.

FIG. 19 depicts an example design of the mounting and retracting mechanism of the differential molds system, with respect to the dispensing head 403, which moves toward +x direction (right) when it dispenses materials. The upper differential mold 420*a* and the lower differential mold 420*b* are connected to two arms (422*a*, 422*b*) respectively. Arm 422*a* is mounted to a base 424 at axis 4291. Arm 422*a* can rotate about axis 4291 and move the upper differential mold to operation position at 420*a* or to resting position at 420*ar*. Similarly, arm 422*b* can rotate about axis 4292 and move the lower differential mold to operation position at 420*b* or to resting position at 420*br*. Thus, the differential molds can be engaged or disengaged according to need. As described previously, the differential molds move together with the dispensing head relative to the dispensed material. In the case when the dispensing head needs to rotate about z-direction, the orientation of the differential molds can be adjusted accordingly by rotating the base 424 about z-direction, for example, along a track 4295 (rotary mechanism not shown).

The ambient condition control unit includes means for controlling the temperature of the atmosphere surrounding the material dispensing area, such as using an air conditioner or a fan, if necessary. It can also include means for controlling the temperature of the base or members onto which the dispensed material attaches. Such examples include passing cooling or heated fluids through internal passages in the base to control its temperature. Electric heat or heated air or inert gas can also be used over the material dispensing area or over the whole workpiece and its base. Whenever needed, the temperature of the differential molds can also be controlled by similar means. These means for controlling temperatures of the ambient, the base and the differential molds apply to different solidifiable materials, not limited to molten metal.

EXAMPLE 2: PLASTICS (POLYMER MATERIAL) AS SOLIDIFIABLE MATERIAL, 3D FREEFORM BY AN EXTRUSION-BASED MEANS 2.1 The Material Dispensing System The material dispensing system is similar to the system of FIG. 8. Metals, such as aluminum, copper or steel, can be used for the material supply unit 402 and the dispensing head 403. The heating means can heat up the metal and then the metal can heat up the plastic material. Inert gas protection is generally not needed.

2.2 Means for Changing the Width of Dispensed Materials

The means of changing the width of dispensed materials by using a dispensing head of adjustable exit size and the corresponding basic mechanisms, as depicted in FIGS. 11 and 12, also apply to plastic materials. However, due to differences in properties between plastics and metals, the internal shapes of the material supplying unit and the dispensing head are different.

In the case of metals, for example in FIG. 12(*a*), the flow speed of the molten metal 480 along the supply duct 402B1 in the material supply unit 402B could decelerate at entering the material cell 404B10, which has a cross-sectional area larger than that of the supply duct. But as long as the flow volume rate is kept constant along the flow path, the material cell can still be kept fully flooded and material dispensing rate can be maintained. That is, a single solid wire 470 acting as a piston to its melt in a supply duct of fixed cross-sectional area can provide various volume flow rates, by varying feed rate, to satisfy the need of dispensing of materials of different sizes (widths).

However, in the case of extrusion of polymers, melt must be accelerated steadily and there should be no dead spots (stagnation zones) along the flow path, according to know-how from traditional bulk extrusion processes (see W. Michaeli, *Extrusion Dies for Plastics and Rubber,* 2nd ed., Hamer, Munich, 1992, p. 190, which is incorporated herein for this current invention by reference). Therefore, shapes of internal duct, cell space and gating members as well as gating mechanism should be designed to have (1) continuous lines without steps or jumps and (2) always decreasing cross-sectional areas along the flow path, even between parts having relative movements. Two example designs are described below.

Figure 20:
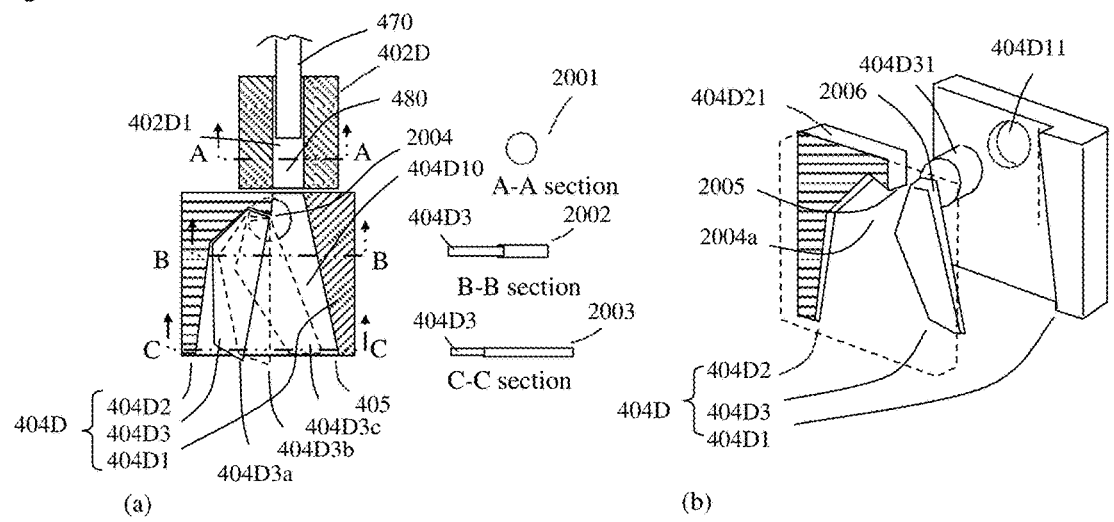
FIG. 20 illustrates still another example approach of adjusting cross-sectional size of dispensed material during dispensing by adjusting dimension of the exit of the dispensing head in this invention.

FIG. 20 depicts a first preferred system of the material supply unit and the dispensing head for polymer dispensing by extrusion. FIG. 20(*a*) shows cross-sectional views and FIG. 20(*b*) shows an exploded view. A wire of solid material 470 is fed into the material supply unit 402D via a duct 402D1 and is heated to become melt 480. The dispensing head includes a main body 404D1, a cover part 404D2 and a side-slab 404D3 for adjusting the size of the exit 405. The melt flows through the cell space (melt chamber) 404D10 and exits at exit 405. The cell space is confined at left by the side-slab, which can rotate about an axis 2004 (2004*a*) to open up (e.g. position 404D3*a*) or close down (e.g. position 404D3*c*) the exit. The side-slab includes a shaft structure 404D31 that sliding fits into a bore 404D11 on the main body to allow such rotation. The cover part 404D2 has a raised structure 404D21 that, when the system is assembled, forms the space for the cell space and the space for motion of the side-slab. The leading edge of the raised structure at 2005 touches the top edge of the side-slab at 2006, forming a contacting line and a mechanical seal so that the melt will be confined in the cell space and will not flow to the back of the side-slab. This contacting line 2004 is made to locate right on the rotation axis 2004*a* of the side-slab mechanism, so that rotation of the side-slab does not change its location nor affect the sealing. This way, the flow lines of the melt are always continuous without steps or jumps regardless of angle of the side-slab. Further, the cross-section of the cell space is made to be always decreasing by decreasing cell gap sizes along the flow path, as illustrated in sectional views of A-A (2001), B-B (2002) and C-C (2003). The thickness of the side slab, which moves inside the gap, also varies along the flow direction accordingly.

Figure 21:
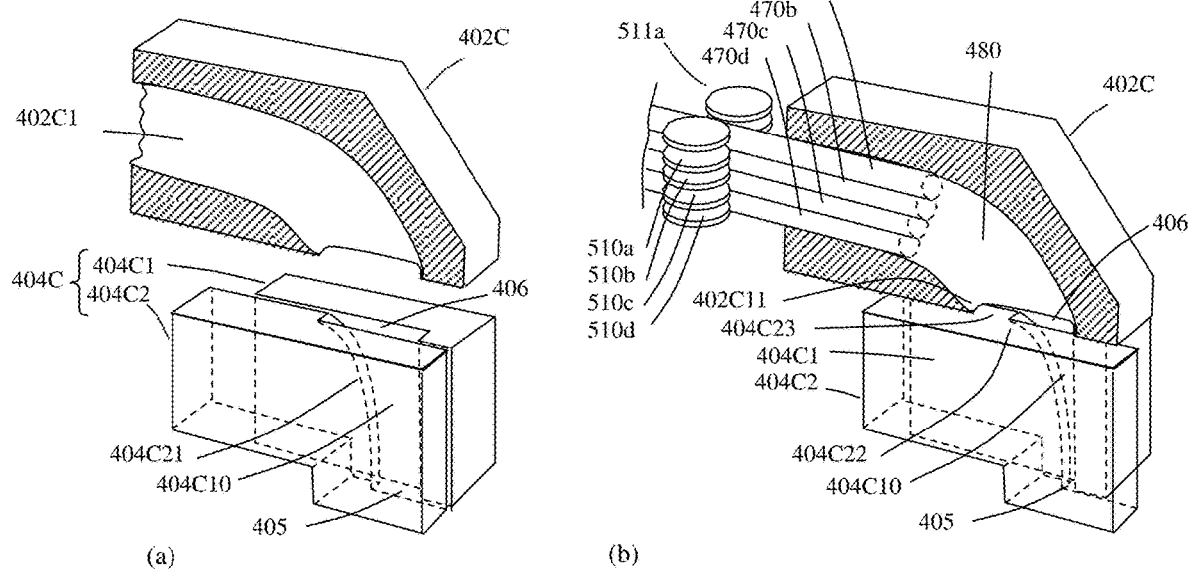
FIG. 21 illustrates still another example approach of adjusting cross-sectional size of dispensed material during dispensing by adjusting dimension of the exit of the dispensing head in this invention.

FIG. 21 depicts another preferred system of the material supply unit and the dispensing head for polymer dispensing by extrusion, which can dispense large amount of material whenever needed. FIG. 21(*a*) shows an exploded view of the material supply unit 402C (showing a cross-section without showing its opposing half) and the dispensing head 404C. FIG. 21(*b*) illustrates the system assembled together. The dispensing head includes 2 parts, 404C1 and 404C2. Part 404C2 can slide relative to 404C1 to open and close the exit 405. Part 404C2 includes a curved feature 404C21 as one internal surface of the material cell 404C10, so that the cell space has a shrinking cross-section along the flow path. In the material supply unit, the material duct 402C1 can take multiple solid wires (470*a-d*) aligned in an array, as shown in FIG. 21(*b*). When part 404C2 opens to maximal position, the top of the curved feature 404C22 aligns to the edge of the lower end of the material duct 402C11, such that the curvature is generally continuous. In addition, the curves at 404C22 and at 402C11 are made to approach the top surface of the dispensing head at 404C23 in a near asymptotic fashion so that when part 404C2 closes to a smaller exit size, as shown in FIG. 21(*b*), the flow direction of the melt does not change abruptly. As a result, the system has a combined internal shape of always decreasing cross-sectional area along the flow path and the dispensing head can still change its exit size.

Solid wires (470*a-d*) can be fed into the material supply unit by using a set of rollers or gears (510*a-d*, 511*a*). These rollers can be controlled independently so that material feed rate can be controlled to match dispensing volume rate. When the exit is opened to the maximal size, all solid wires can be fed at the same time to supply the required large volume flow rate. When the exit is closed down to the smallest size, only one solid wire needs to be fed to supply the minimal dispensing rate.

Figure 10:
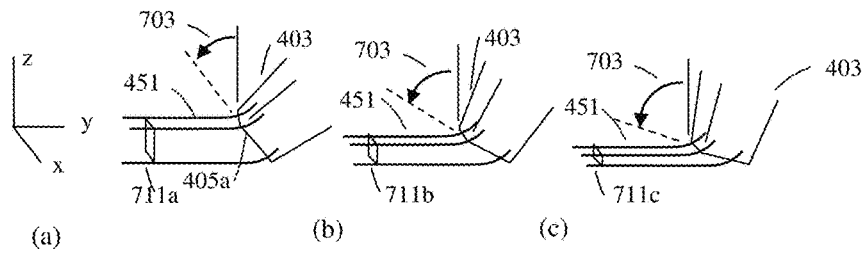
FIG. 10 illustrates another example method of adjusting cross-sectional size of dispensed material during dispensing by adjusting dispensing head orientation in this invention.

By using adjustable exit described above, this invention can change material deposition rate and width as required by local geometry. The design of stacked multiple gating members of FIG. 27 and design of the recess feature and nozzle structure of FIG. 28 can also be applied. When the exit is closed down to minimal size, the system becomes basically similar to the FDM technique. In addition, the methods of changing the width of dispensed materials by adjusting the orientation of the dispensing head as depicted in FIGS. 9 and 10 apply to plastics as well. The design and operation of the differential molds, as depicted in FIGS. 14-19, also apply to plastic materials.

One issue in forming and shaping of polymer material is the so called die swell effect, which involves non-linear scale change when the mechanical boundary conditions around a polymer melt change. When the melt leaves the exit of the dispensing head, the material will expand and will not maintain the cross-sectional shape of the exit. To correct such dimensional change, the exit shape can be designed in anticipation of the die swell effect by referring to experiences and data form traditional polymer extrusion process, for example in the reference book by W. Michaeli, *Extrusion Dies for Plastics and Rubber*, New York: Oxford University Press, or by using polymer processing simulation software.

EXAMPLE 3: MOLTEN METAL AS SOLIDIFIABLE MATERIAL, 3D FREEFORM BY A CASTING-BASED MEANS, WITH AUXILIARY ON-SPOT HEATING

Figure 22:
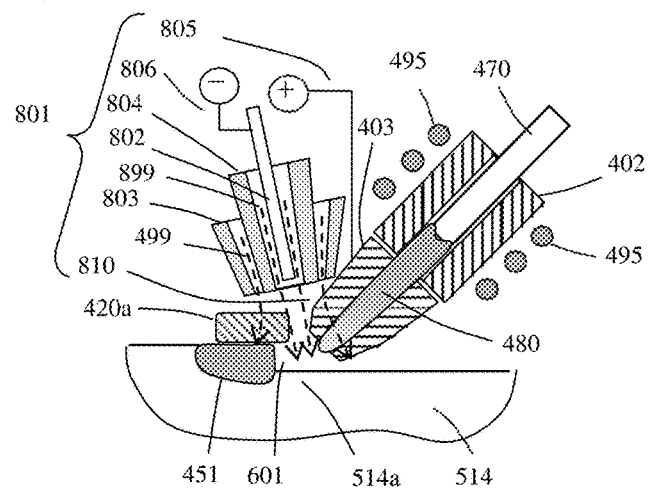
FIG. 22 illustrates an example approach of using an arc-based heating unit for auxiliary and localized heating in this invention.

If the temperature of the base material, which the solidifiable material to be dispensed onto, is too low or its heat sink is too large, the molten metal from the dispensing head may not be able to heat up the previously solidified material within a short time. In this case, the newly dispensed metal could solidify prematurely without good bonding to the base material. To resolve this issue, an auxiliary heating can be applied on spot, i.e. at the targeted dispensing location, to locally preheat the base material. The auxiliary heating source should be able to deliver concentrated heat in a relatively short time. Such a heating source can be constructed based on the principle of a few industrial fusion welding systems, such as gas tungsten-arc welding, plasma-arc welding, or laser welding. FIG. 22 depicts an example system of this invention with an auxiliary arc-based heating unit. 801 indicates an auxiliary heating unit based on the principle of plasma-arc welding torch. 802 is a tungsten electrode connected as negative electrode. Plasma gas 899 flows through an inner passage 804, whereas shielding gas flows through an outside passage 803. The housing of the dispensing head 403 is connected as positive electrode. As a result, the arc forms mainly in the space 810 between the tungsten electrode and the front end of the dispensing head housing 403. However, high temperature plasma gas can still jet down to reach the target area 514*a*, rather similar to the case of non-transferred plasma welding scenario. Because plasma arc could generate very high temperature at the core of the plasma gas, a high temperature material, such as graphite, should be used at the outside of the dispensing head housing as the positive electrode. Proper regulation and control small current pulses can generate just enough concentrate heat to heat up the target area. This arrangement allows the arc heating unit to be placed at a distance away from the workpiece (target area) with enough space for the dispensing head tip and the differential mold 420*a*.

EXAMPLE 4: PLASTICS (POLYMER MATERIAL) AS SOLIDIFIABLE MATERIAL, 3D FREEFORM BY AN INJECTION-BASED MEANS

Polymers in fluid state can be dispensed by methods other than extrusion. For example, the principle of a plastic injection molding machine, more specifically the injection-molding screw mechanism, can be applied to convert solid polymer pellets into melt. Such a mechanism is described in, for example, E. Lokensgard, *Industrial Plastics: Theory and Applications*, 5th ed., Delmar, Clifton Park, NY, 2010, p. 155-159, which is herein incorporated into this invention by reference.

EXAMPLE 5: MOLTEN METAL AS SOLIDIFIABLE MATERIAL, 3D FREEFORM BY AN INJECTION-BASED MEANS

Molten metals, especially those of lower melting points, can also be dispensed by injection, in analogy to metal injections applied in die casting. Another method to dispense molten metal is to shoot metal droplets. M. Orme and R. F. Smith, "Enhanced Aluminum Properties by Means of Precise Droplet Deposition", *Journal of Manufacturing Science and Engineering*, August 2000, vol. 122, p. 484-493 describes such a system for shooting aluminum droplets in details, which is incorporated to this current invention by reference.

EXAMPLE 6: MAKING A 3D ARTICLE

Figure 23:
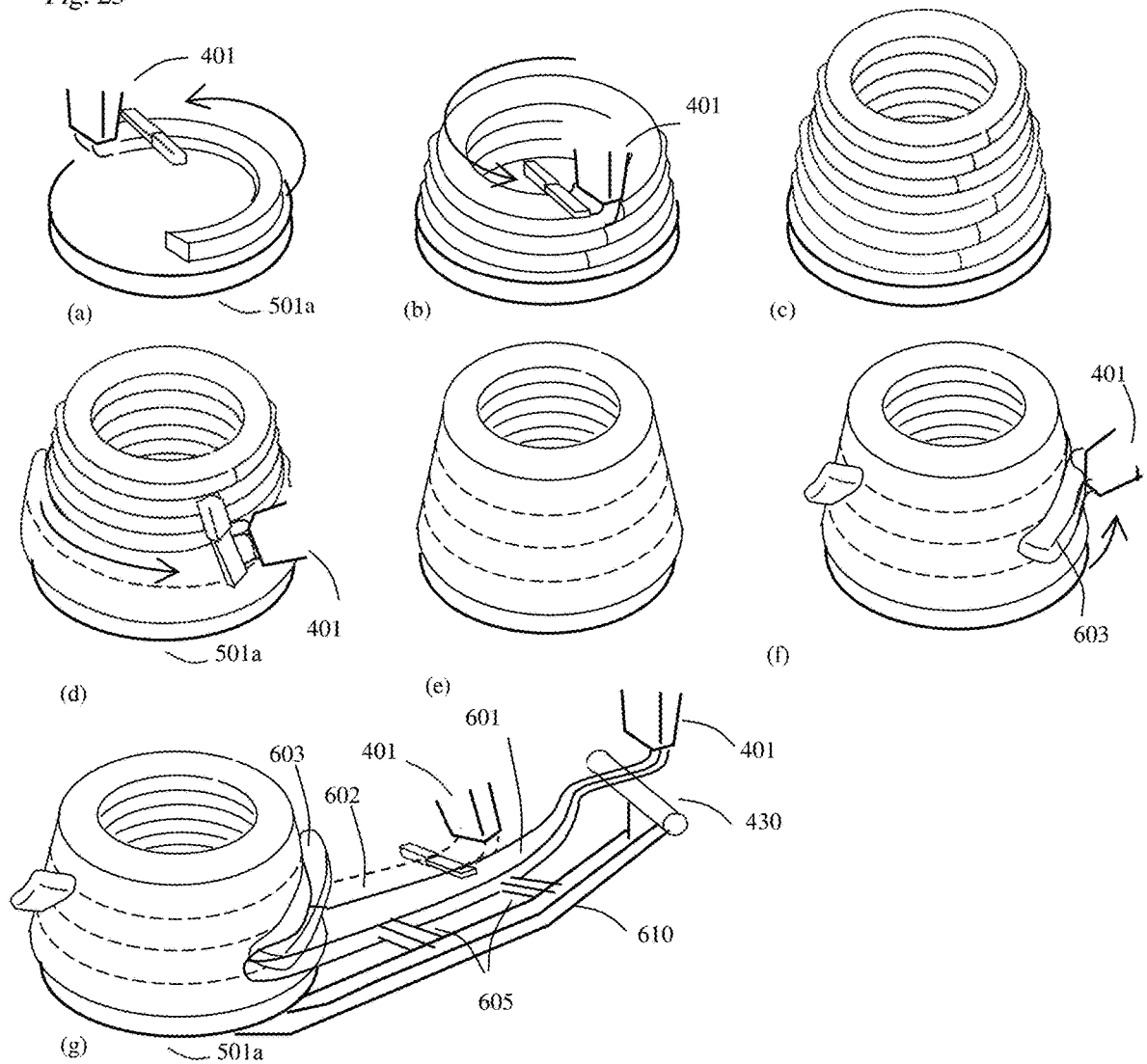
FIG. 23 illustrates an example process of making a 3D article by this invention.

FIG. 23 illustrates the process of making a 3D article, using the 3D part shown in FIG. 1 as an example. For simplicity and clarity, it is assumed that the base 501*a* and the part do not move, whereas the material dispensing system 401 moves. From FIG. 23(*a*) to FIG. 23(*c*), the material dispensing system dispenses materials on the base to make the interior of the hub. From FIG. 23(*d*) to FIG. 23(*e*), the external surface of the hub is made. In FIG. 23(*f*), the roots 603 of the blades are made. This step is similar to the process of FIG. 10. The roots serve as starting structure for blade making in the next step. In FIG. 23(*g*), blades are made. Material dispensing starts from the roots 603 and moves away from the hub. Depending on material and thickness, dispensed suspending component geometries could have enough stiffness to maintain their shapes without the need of external supports. Whenever external supports are needed, they can be pre-fabricated by the same process before the suspending portions of the part are made. For example, 610 indicates an external support frame attached to the base 501*a* and the fixture frame 430 on the base, together with short support posts 605 connected to it. When the edge portion 601 of the blade is formed, material is dispensed to pass by and join with the short posts, so as to be supported. When the internal bands are formed, such as 602, they can use adjacent previously dispensed and solidified portion as support. External supports can also be formed under the suspending structure, as what is usually done in the existing FDM process.

EXAMPLE 7: MAKING MOLD INSERTS, ESPECIALLY SEAMLESS MOLD INSERTS WITH CONFORMAL COOLING PASSAGES

By applying the material dispensing process of this invention, a new method of making 3D articles, especially metal molds, featuring combined additive and subtractive processes can be devised. The so called subtractive process is producing shapes by removing materials from a stock. The so called additive process is adding materials by this current flexible 3D freeform method. This new method is especially suitable for making seamless mold inserts with conformal cooling passages. This method can be called "flexible mold surface forming technique".

Figure 24:
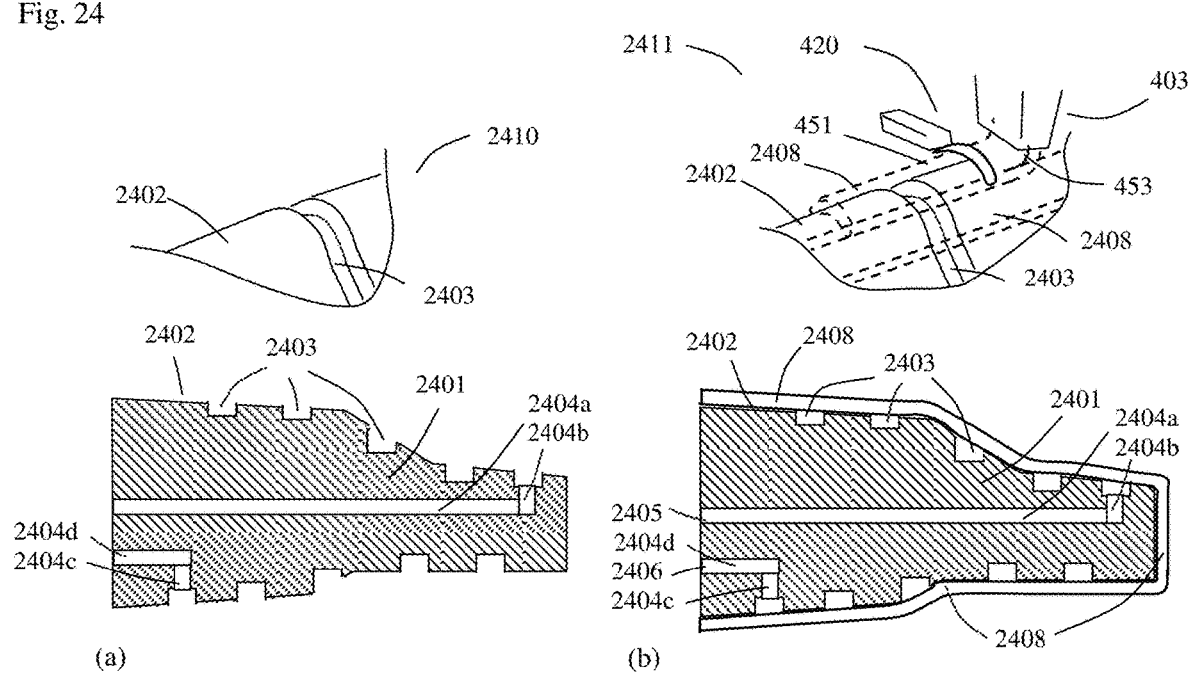
FIG. 24 illustrates an example of making a mold core by the flexible mold surface forming technique in this invention.

FIG. 24 illustrates the first example of making a mold insert by the flexible mold surface forming technique. A mold core 2401 is first produced by machining, as shown in cross-sectional view in FIG. 24(a). Its surface profile 2402 is close to but slightly smaller than the final mold profile. A system of connected ditches (recess structure) 2403 is then made into the surface by machining. A set of holes (2404a-d) are then drilled to connect to two ends of the ditch system. 2410 illustrates a portion of the mold core surface 2402 and the ditch 2403 in enlarged perspective view. In the next step, as illustrated in FIG. 24(b), the material dispensing process of this invention is applied to cover the mold core surface with a layer of material. 2411 shows a local scenario where the dispensed and solidified material (2408, dashed lines) covers the original mold core surface 2402 as well as the ditch 2403. The dispensed material 2408 becomes the new mold surface, covering all ditches. Therefore, the ditch system now becomes internal, conformal passages for cooling fluid. In the completed mold core, cooling fluid enters the core from inlet 2405 and flows into the covered ditch system through holes 2404a-b. The cooling fluid then flows in the covered ditch system 2403 and circulates through the core right underneath the mold surface and then, through holes 2404c-d, out of the outlet at 2406.

Figure 25:
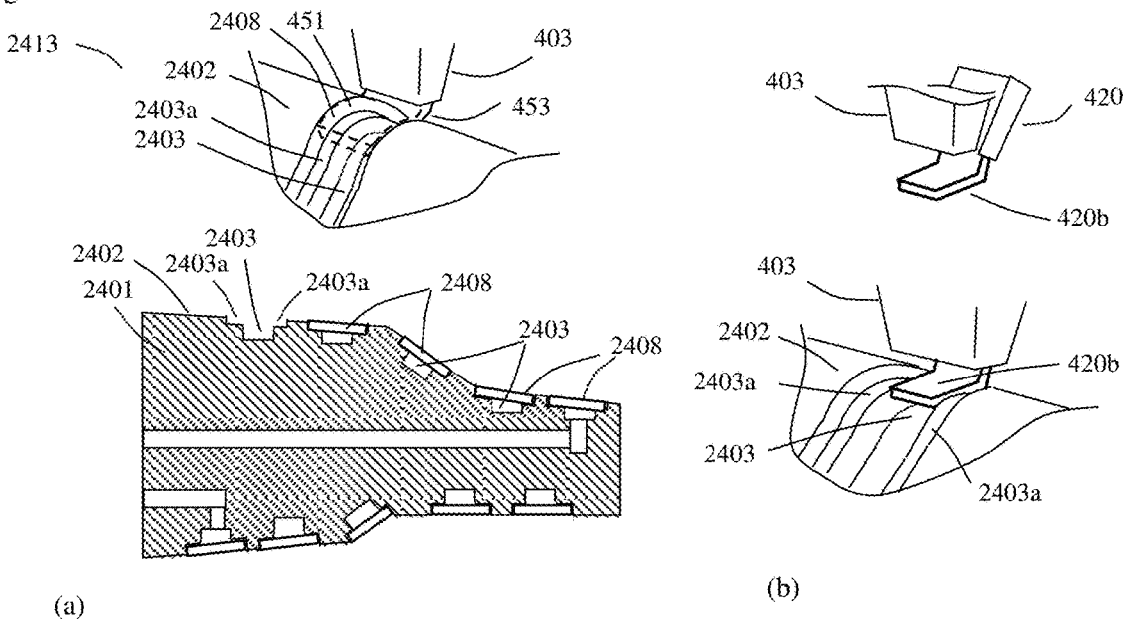
FIG. 25 illustrates another example of making a mold core by the flexible mold surface forming technique in this invention.

FIG. 25 illustrates the second example of making a mold insert by the flexible mold surface forming technique. The mold core 2401 is shown in cross-sectional view. 2413 depicts part of the mold core surface and the surface cooling duct (ditch) in enlarged perspective view. In comparison with FIG. 24, the surface of the mold core 2402 is machined to a dimension very close to the final mold surface, leaving only allowance for final surface polishing. The spiral ditch structure around the core surface includes an additional recessed step feature 2403a along both banks of the ditch 2403. In the step of material dispensing, the solidifiable material is dispensed over the recess feature 2403a to cover up the spiral ditch but not the core surface 2402. In this way, much less material is needed and faster processing can be achieved. When the ditch is wide, in order to prevent dispensed material from falling into the ditch, especially in the case when materials in particulate form are dispensed, a lower differential mold 420b can be applied under the dispensing head 403 and positioned between the two banks of the ditch at the level of the recessed step. The differential mold can thus block the opening of the ditch under the dispensing head so that the dispensed material flows to the recessed step but not into the ditch. This is illustrated in FIG. 25(b). The lower differential mold 420b can be a separate device 420 or can be a part of the dispensing head, as depicted in FIG. 25(b). This method can also be applied to the case of FIG. 24.

EXAMPLE 8: MAKING SEAMLESS MOLD CAVITY

Figure 26:
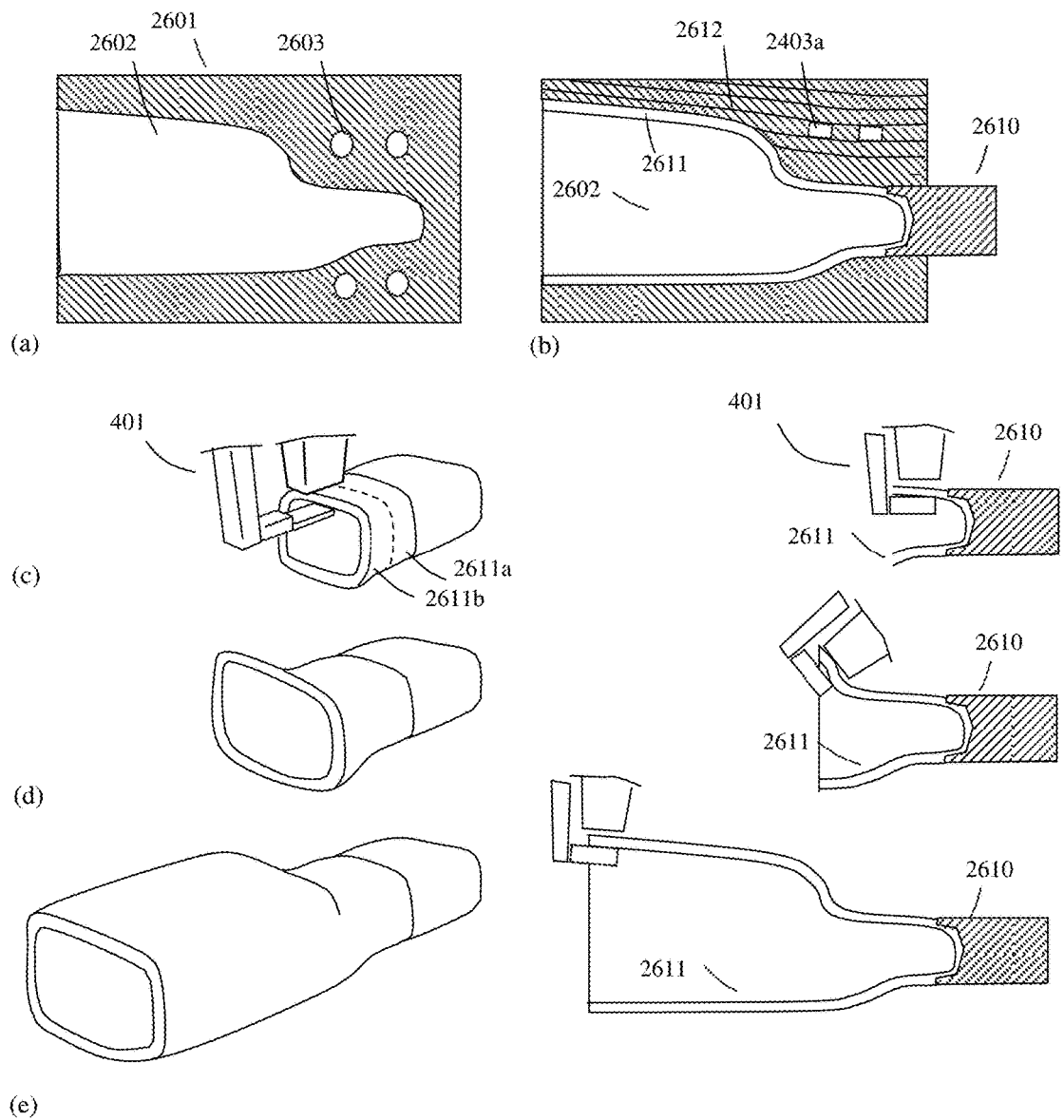
FIG. 26 illustrates an example of making a mold cavity by this invention.

This invention can also be applied to make seamless mold cavity. FIG. 26(a) depicts a cross-sectional view of a mold insert 2601 with the mold cavity 2602 and cooling passages 2603. Such geometry usually requires a slow process of die sinking using electric discharge machining (EDM) to make. FIG. 26(b) illustrates a cross-sectional view of such a geometry made by using the current invention. The process starts with a starting block 2610, which can be made by machining. Then a shell of the inner surface 2611 is made by using the current invention. FIG. 26(c)-(e) depicts the process of making the inner shell 2611. After the inner shell is made, additional layers of materials 2612 are added to the exterior as reinforcement. Internal cooling passages 2403a can also be formed by leaving grooves and then covering them during the buildup of the layers of materials 2612.

Various fillers for tool steels can be used as the solidifiable materials for making mold inserts and information can found from publications such as *Tool Steel Filler Metal Characteristics—TIG* Welding from http://www.stoodyind.com/Catalogs/FISC/05catpg394.pdf, and *Welding-Tool-Steel: Difficult but Rewarding Task. Solutions with Effective, Practical Advice* from http://www.welding-advisers.com/Welding-Tool-Steel.html, both documents are incorporated herein for this current invention by reference.

In general, a mold is a tool. Other tools, such as cutting tools or cutting tool holders, with complex internal cooling passages can also be made by the similar methods described in examples 7 and 8.

EXAMPLE 9: DISPENSING HEAD CAPABLE OF DUAL DISPENSING DIRECTIONS

The exit of the material dispensing head described so far has a long (width) edge 405a and a short edge 405b, as depicted in FIG. 4 and other figures. By orienting the dispensing head with its long (width) edge horizontally, band-shaped materials in lying positions can be dispensed; and orienting the dispensing head with its long (width) edge in erected position, band-shaped materials in erected positions (vertical wall-shaped) can be dispensed, as depicted in FIG. 9 and FIG. 10 respectively. Being able to dispense band-shaped (ribbon-shaped) materials in both horizontal (lying) positions and erected positions provides flexibility in assembling ribbons in different orientations to fabricate a 3D article, e.g. as illustrated in the example of FIG. 23. It will be convenient if a material dispensing head is able to dispense band-shaped materials in both horizontal (lying) positions and erected positions without the need of reorienting exit orientation. This can simplify operation and programming of the motion system and provide increased geometric flexibility. In general, such a dispensing head capable of dual dispensing directions comprises two exits with their long edges oriented in two perpendicular directions. The two exits are connected and the material to be dispensed is supplied from the same material cell. Two gating members independently control the two exits respectively.

Figure 29:
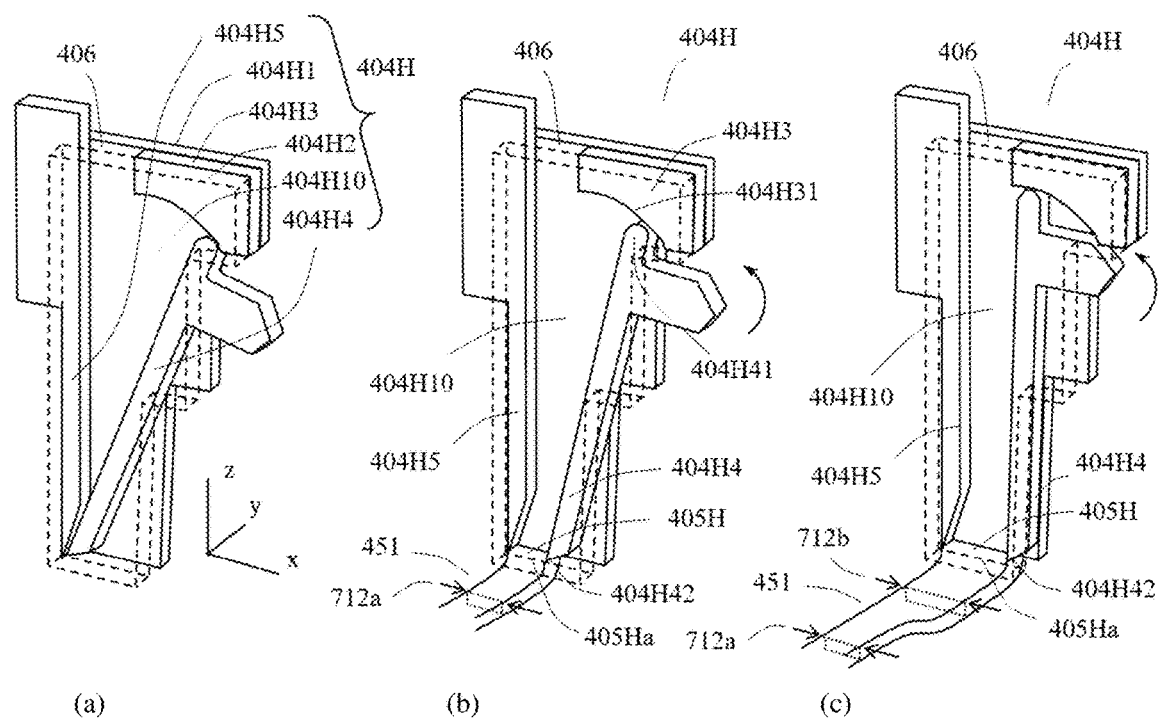
FIG. 29(a)-(f) depict construction and operations of an example of the dispensing head capable of the dual dispensing directions by this invention.
Figure 29:
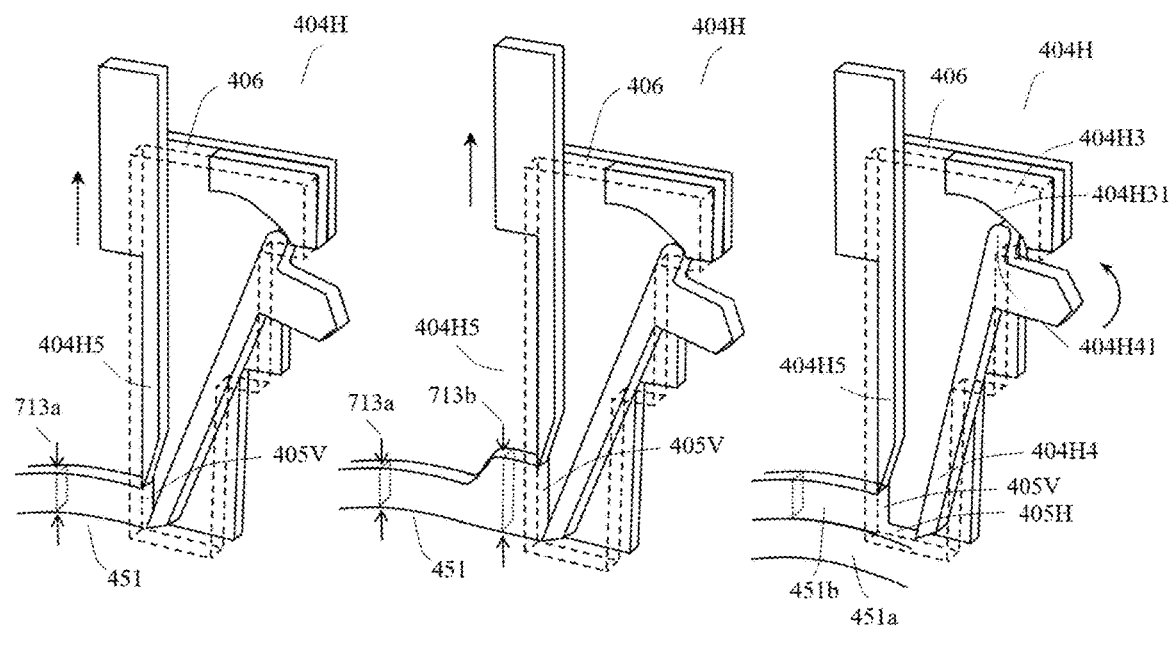

FIG. 29 depicts construction and operations of an example of the dispensing head capable of the dual dispensing directions. FIG. 29(a) depicts the construction in perspective view. The material cell 404H comprises two side walls (right wall 404H1 and left wall 404H2), two gating members (horizontal gate 404H4 and vertical gate 404H5) and a top structure 404H3 sandwiched between the two walls. The confinement of the two walls, the two gating members and the top structure forms the material cell space 404H10, which has an opening 406 at top as material inlet for receiving material from the material supply unit (not shown here). The horizontal gate 404H4 controls a horizontal exit with the long edge of the exit oriented along horizontal direction; the vertical gate 404H5 controls a vertical exit with its long edge oriented along vertical direction. In FIG. 29(a), the two gating members are closed so the two exits are closed. The horizontal exit 405H is opened up by moving and rotating the horizontal gate 404H4 counterclockwise as depicted in FIGS. 29(b) and 29(c). The long edge 405Ha of the horizontal exit is oriented along horizontal direction as depicted. By moving the horizontal gate to different positions, band-shaped material 451 can be dispensed with different widths in horizontal positions, as shown at 712a and 712b in FIGS. 29(b) and 29(c). The vertical exit 405V is opened up by lifting the vertical gate 404H5 upward, as depicted in FIGS. 29(d) and (e). The long edge 405Va of the vertical exit is oriented along vertical direction as depicted. Similarly, by lifting the vertical gate to different positions, band-shaped material 451 can be dispensed with different heights in erected positions, as shown at 713a and 713b in FIGS. 29(d) and 29(e).

In the example of FIG. 29, the two exits are connected and the material to be dispensed is supplied from the same material cell 404H10. The two gating members independently control the two exits respectively. The two gating members can also be opened at the same time to dispense a single band of material, because the two exit openings 405V and 405H are connected externally, as illustrated in FIG. 29(f), which also depicts the dispensing of a band of material 451b in erected position over the top of another band of material also in erected position 451a. The horizontal opening 405H provides more contact area between the two band and improves joining.

The cell 404H is assembled with proper contact pressure between the gating members and the walls as well as between the tip 404H41 of the horizontal gate and the lower edge 404H31 of the top structure so that the gating members can move while leakage of material can be kept to minimum.

The horizontal gate applies a basically rotating gate motion rather than a sliding gate motion. This design reduces the width of the lower portion of the material cell. As shown in FIG. 29(c), which depicts the situation when the horizontal gate 404H4 is fully open, the width of the lower portion of the material cell is only slightly larger than the width of the horizontal exit 405H. This gives the dispensing head more flexibility when maneuvering to avoid head-part interference. By applying this gating motion, it is preferred that the lower tip of the gate member 404H42 follows a straight line along the edge of the exit 405Ha. This cannot be achieved by simply rotating the gate member 404H4 about a fixed axis. A rotation-plus-translation motion is required.

Figure 30:
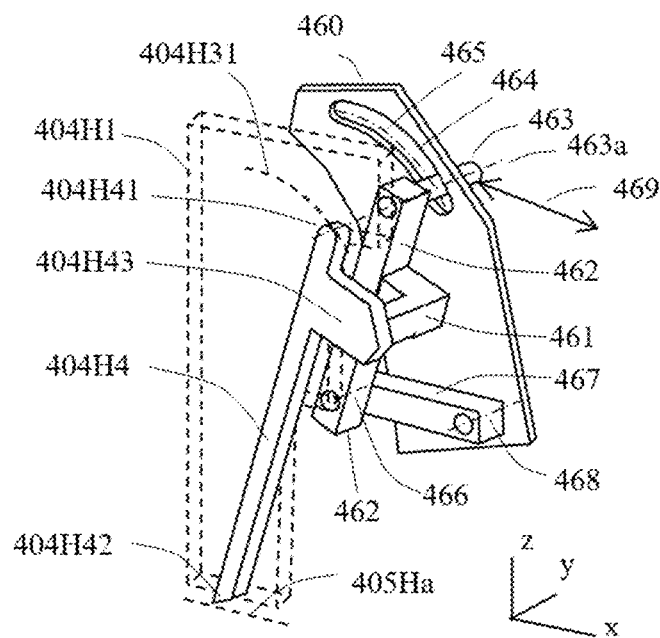
FIG. 30 depicts a preferred gating mechanism for the dispensing head of FIG. 29.

FIG. 30 depicts a preferred mechanism for achieving the rotation-plus-translation motion of the horizontal gate 404H4. First of all, because the cell space 404H10 between the two side walls has a very limited width, the mechanism for moving and rotating the horizontal gate member is placed outside of the material cell, or outside of the right wall 404H1. The gating member 404H4 is connected at its handle 404H43 by an "L" structure 461 to a post 462 such that the gating member and the post become an integral solid body. The handle 404H43 and the "L" structure form a "U" structure such that when the gating member is placed inside the material cell space the right wall 404H1 goes in between the gating member and the post. That is, the post 462 is outside of the material cell. Because the post and the gating member are rigidly joined and the gating member is to move along the inner surface of the right wall that is parallel to the x-z plane, moving the post along a plane parallel to the x-z plane moves the gating member by exactly the same translation and rotation. Thus, a mechanism can be placed outside of the material cell to drive the post to control the gating member. The lower end of the post is connected to one end of a beam 467 by a shaft at axis 466. The other end of the beam 467 is attached to a base frame 460 by a shaft at axis 468. To the top end of the post is attached a shaft 463 that is restricted in motion by a curved slot 464 on the base frame 460. Thus, the post and the beam form a 2-bar rotatable and movable linkage system with one rotatable end at axis 468 and the other end restricted by the slot 464. The material cell, and thus the right wall 404H1, and the base frame 460 of the gating mechanism are both fixed to a mounting base of the dispensing head (not shown). The track of the slot 465 carries the same profile as the lower edge 404H31 of the top structure in the material cell and is aligned to the lower edge 404H31. Also, the tip 404H41 of the gating member 404H4 is aligned to the axis 463a of the shaft 463. As a result, when an actuating member (not shown, pushing action indicated by 469) pushes the shaft 463 to move along the track of the slot, the gating mechanism with the post 462 will carry the gating member to move in the material cell with its tip 404H41 in contact with and moving along the lower edge 404H31 of the top structure. In the meantime, the posture of the 2-bar linkage system (post 462 and beam 467) is always kept definite and a specific angle of the post (and the gating member) corresponds to a specific position of the shaft 463 in the slot 464. By designing a proper profile for the lower edge 404H31 and the track of the slot 465, the gating member 404H4 can move slightly upward while it rotates and opens (or slightly downward while it closes) such that the lower tip of the gate member follows a straight line along the edge of the exit 405Ha.

It is further preferred that the volume of the material cell space 404H10 (FIG. 29(a)-(c)) is kept constant so that material inside the cell will not be squeezed out when the gating member 404H4 closes or air voids are not generated when the gating member opens. This can be achieved by designing a proper distance between axis 463a and axis 466 relative to the total length (from the tip to the lower end) of the gating member 404H4.

EXAMPLE 10: SHAPING AND HOT SCRAPING OPERATIONS, AND THE THICK-LAYER BUILDING METHOD

Figure 31:
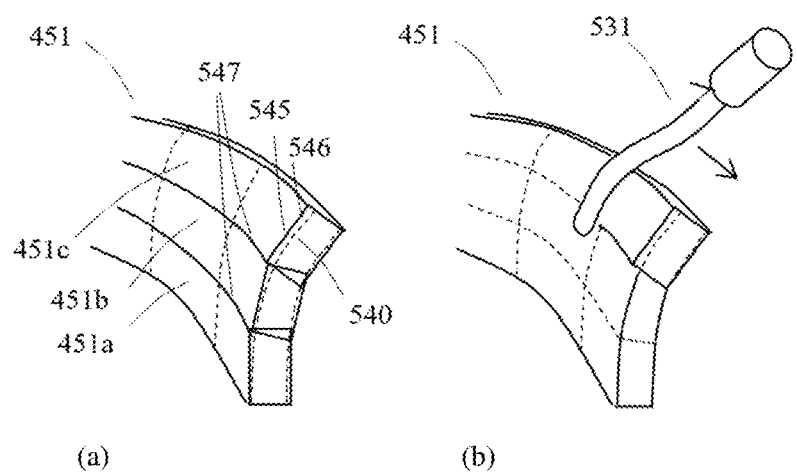
FIG. 31(a) illustrates an object of multiple ribbons dispensed and stitched in erected positions in the vertical direction.
FIG. 31(b) depicts a hot-scarping shaping tool used to shape and smooth the edges of each layer of the object.

When multiple ribbon-shaped dispensed materials are stitched together to become a surface, seams between adjacent ribbons could occur and affect the surface finish of the part. Material swell or shrinkage could also affect dimensional accuracy. For example, referring to FIG. 31(a), applying the dispensing head of FIG. 29 using the vertical exit to dispense a material together with the motion system of FIG. 5(b) can stitch multiple ribbons (451d, 451e, 451f) in erected positions in the vertical direction to form a wall 451 with an approximate curvy shape in the vertical direction. However, each ribbon has straight sides in the vertical direction, as shown at 545, so that the vertical profile of the wall is basically prismatic rather than curvy as indicated by dash lines, e.g. 541, in FIG. 31. To obtain the ideal curvy shape and good surface finish, extra materials, e.g. at 546, and extra materials at seams, e.g. 547, need to be removed.

Figure 32:
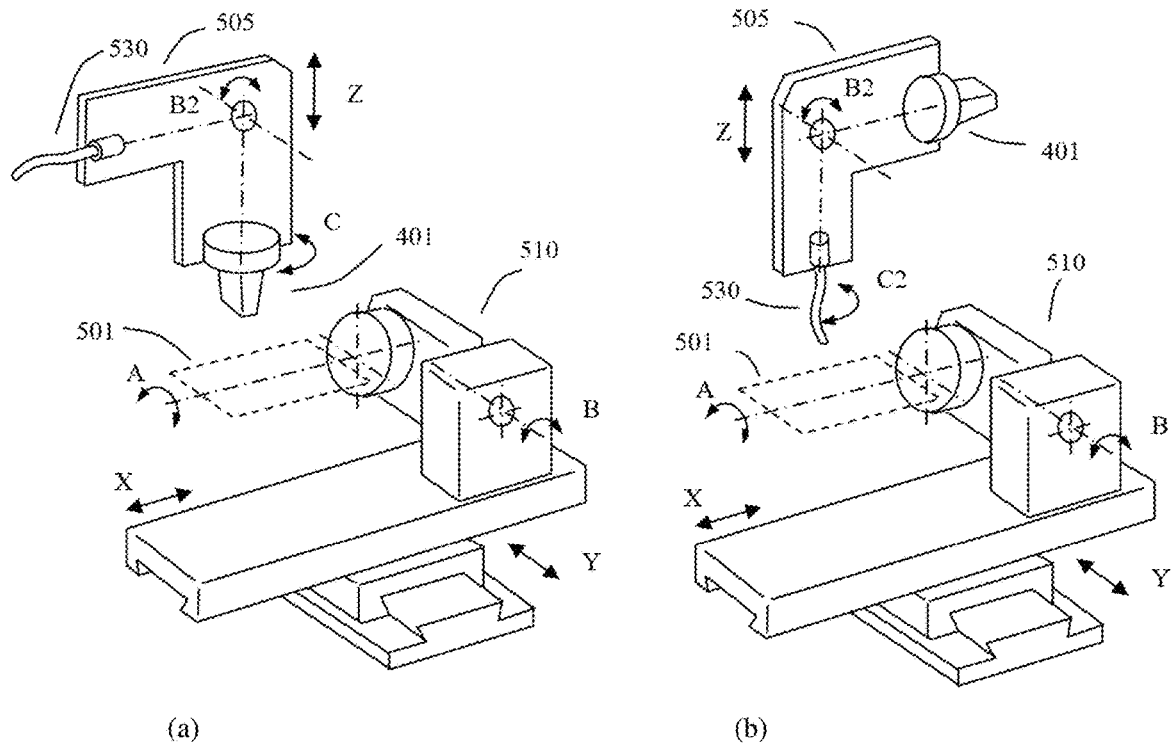
FIG. 32 illustrates a modified mechanisms of FIG. 5(b) for switching between the material dispensing head and a shaping tool by this invention.
Figure 33:
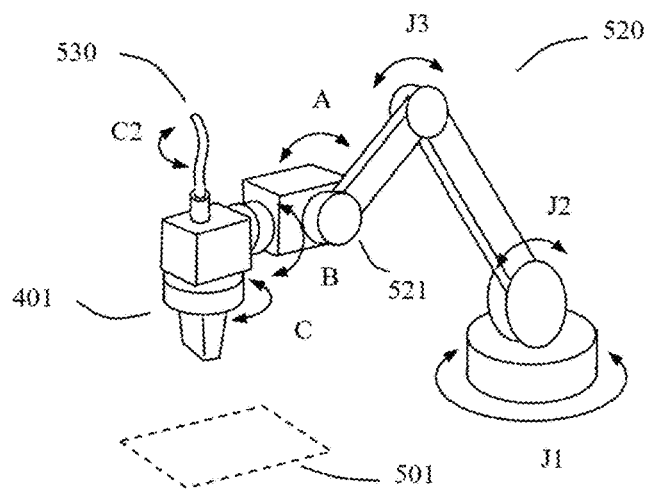
FIG. 33 illustrates a modified mechanisms of FIG. 5(a) for switching between the material dispensing head and a shaping tool by this invention.

One approach to correct the dimensional error and improve the surface finish is to perform a secondary reshaping and smoothing process by applying a shaping tool upon the originally formed surfaces. Because the Flexible 3D Freeform technique uses a multiple-DOF mechanism, e.g. a 5-DOF machine stage or a robotic arm, to provide flexible relative movements between the workpiece and the material dispensing head, replacing the dispensing head with the shaping tool can easily allow the shaping tool to trace almost all the surfaces of the formed workpiece. A preferred approach is to use a tool holding system capable of switching tools, similar to the system used for the spindle in a machining center, so that the system can switch between the dispensing head and the shaping tool as needed. Alternatively, as depicted in FIG. 32, the z-stage of the 5-DOF motion system of FIG. 5(b) can be modified to include a rotary tool holding unit 505 to hold both the dispensing head 401 and the shaping tool 530. The rotary tool holding unit can rotate about axis B2 to switch between the dispensing head and the shaping tool. The rotary tool holding unit can be modified to include more tools and switching positions if necessary. In the case using a robotic arm as the motion system, the rotary tool holding unit can be mounted to the end of the arm, as depicted in FIG. 33, wherein B axis switches between the dispensing head and the shaping tool.

For most materials, the shaping tool can be a cutting tool, such as a milling cutter used in traditional machining processes. The milling cutter, for example, having a ball end, can trace and cut over the 3D surfaces.

For materials of low melting/deforming temperatures, such as thermoplastics and waxes, the shaping tool can be a simple heated element and the reshaping and smoothing process can be a process of hot scraping. This is similar to cutting but is performed at elevated temperature so that materials on the surfaces of the workpiece can be deformed and reshaped easily, without the need to rotate the tool at high speed. The shaping tool can take the forms as the differential mold designs depicted in FIG. 15 and FIG. 16, so that it can scrape curved surfaces and can adapt varying curvatures. A heating source can be added to the base of these configurations to adjust scraping temperature. FIG. 31(b) depicts such a hot-scraping shaping tool 531 used to shape and smooth the edges of each layer after dispensing.

By applying the shaping tool described above, an alternative procedure of fabricating a 3D article of this invention is called "Thick-layer Building". In this procedure, instead of the multiple directional freeform building method as illustrated in FIG. 23, a 3D article is built by a layer-by-layer fashion similar to the traditional additive manufacturing procedure except that the height of each layer is significantly larger than the traditional layers. So an article can be built with only a limited number of layers and the building speed can be increased. In the traditional layer-by-layer additive manufacturing processes, the thickness of each layer have to be small so that features or curvatures along the vertical direction can be formed by minute adjustments of horizontal positions of joining operation or material deposition. However, in this Thick-layer Building scheme, within each layer, geometric variations in the vertical direction (or in the direction of layer buildup) are formed by, first, dispensing of ribbon shaped materials and, then, reshaping/smoothing of the dispensed layer. The differential molding methods can be applied together with the initial material dispensing to make the vertical shapes as close to the desired geometry as possible before the shaping process is used to finalized the shape in a layer. After a layer is formed and shaped to its final geometry, the next thick layer of materials is placed on top of it with another dispensing and reshaping/smoothing operation. The surfaces of the geometry at the joining locations between the new layer and the layer beneath it are reshaped and smoothed so that any seams or unwanted discontinuities can be removed. In this way, during the layer by layer build up process, the geometry of the 3D article beneath the layer currently being built is always fully shaped to final accuracy and smoothness. By this thick layer by thick layer approach, the dispensing head and the shaping tool do not need to stick into narrow or hard to reach deep recesses but only need to stick down a distance of one layer thickness.

Figure 34:
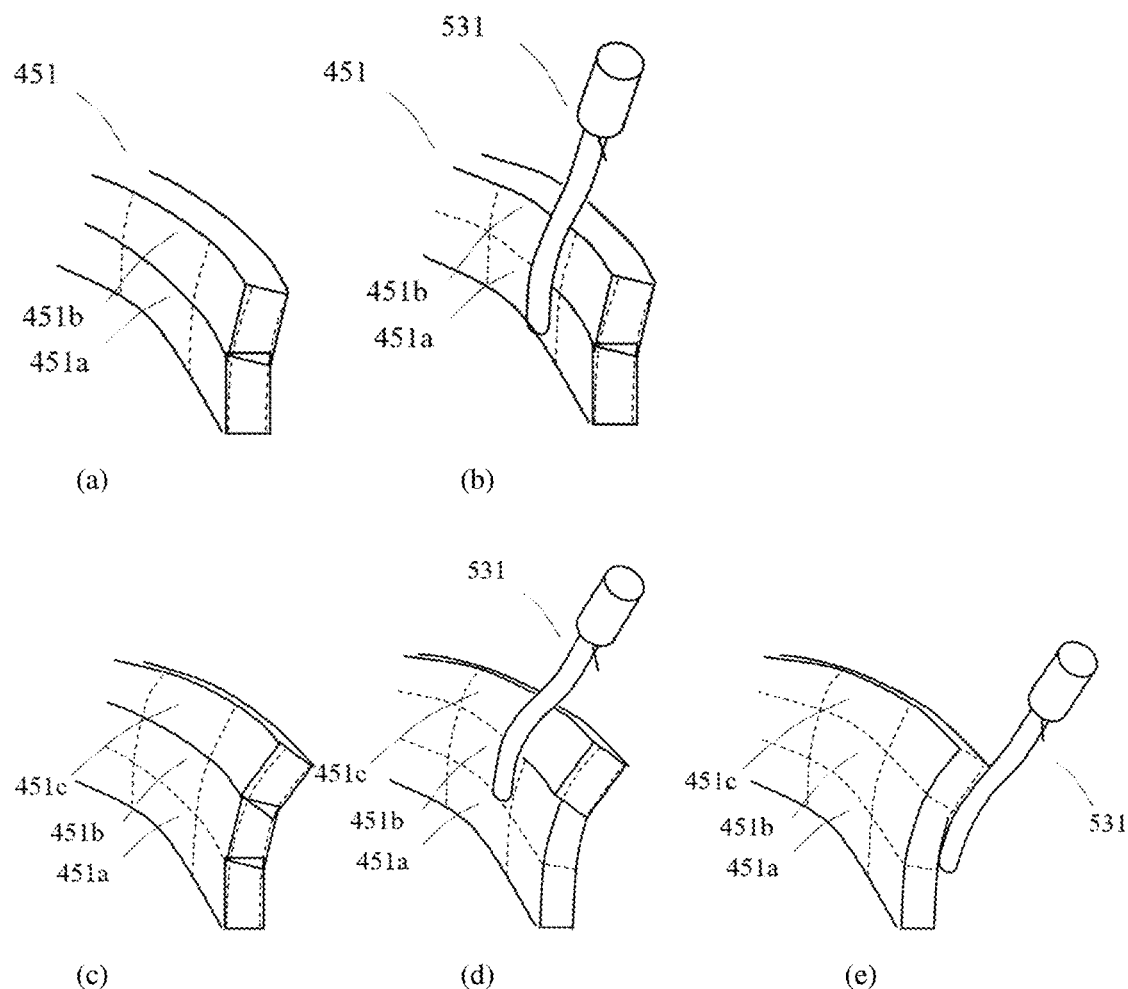
FIG. 34(a)-(e) depict basic principle of the Thick-layer Building method by this invention.

FIG. 34(a)-(f) depict the steps of dispensing and shaping of 3 "thick layers" (3 ribbons) in erected positions by the Thick-layer Building method using a hot scrapping shaping tool 531. First, in FIG. 34(a), layer 1 (451a) and layer 2 (451b) are dispensed. Next, the shaping tool scrapes the 2 layers, FIG. 34(b). Then layer 3 (451c) is dispensed, FIG. 34(c). After that, the shaping tool scrapes layer 2 and layer 3, FIG. 34(d). As described in FIG. 16, the rotatable curved bar of the shaping tool can scrape concave surface, flat surface or convex surface, which is depicted in FIG. 34(e).

The examples of dispensing head described above can be applied to different materials described in the present disclosure. Heating or cooling devices can be added to the material cell if the material in the cell needs to be kept at elevated or low temperature. The tool switching mechanisms depicted in FIG. 32 and FIG. 33 can also be applied to include additional process operations, such as providing heating or binder jetting to dispensed materials.

While the means of specific embodiments in the present disclosure has been described by examples and reference drawings, modifications and variations could be made thereto by those skilled in the art without departing from the scope and spirit of the present disclosure.

What is claimed is:

1. A system for dispensing and building up materials to make a three-dimensional article comprises:
    a dispensing head for dispensing said materials, said dispensing head comprising
    a material cell with a first elongated exit opening through which the materials are dispensed and
    a first gating mechanism for adjusting a cross-sectional dimension of dispensed material, said first gating mechanism comprising
    a first movable gating member inside the material cell for adjusting a dimension of the first elongated exit opening, the first movable gating member comprising
    a recess feature such that when the first movable gating member is positioned to a fully-closed position, said recess feature and said first elongated exit opening form a nozzle structure for dispensing said materials in thin wire- and filament-shapes, the first elongated exit opening having a maximal cross-sectional area of at least 10 times larger than a cross-sectional area of said recess feature; and
    a material supply unit for supplying said materials to said dispensing head, said material supply unit capable of adjusting a material supply rate.

2. The system of claim 1, wherein said first gating mechanism comprises a second gating member for adjusting a thickness of the dispensed material, the second gating member being movable in a direction traversing a movement direction of the first movable gating member.

3. The system of claim 1, wherein said first gating mechanism comprises at least one additional gating member stacked together with the first movable gating member, said additional gating member being movable in a direction same as a movement direction of the first movable gating member but acting independently for adjusting thickness of the dispensed material.

4. The system of claim 1, further comprising an auxiliary heating means that provides localized heat to the first elongated exit of said dispensing head and to a targeted dispensing location to adjust the temperature of dispensed material near said first elongated exit and to preheat the targeted dispensing location.

5. The system of claim 4, wherein said auxiliary heating means comprises an arc welding system and said dispensing head is connected as a positive electrode of the arc welding system.

6. The system of claim 1, further comprising a differential molding device in physical contact with selected positions on the dispensed material leaving the first elongated exit opening of said dispensing head to confine a material flow path and to shape the dispensed material in order to obtain a desired cross-sectional shape.

7. The system of claim 6, wherein said differential molding device comprises a deformable member and an actuation mechanism for adjusting curvature of the deformable member in physical contact with the dispensed material.

8. The system of claim 6, wherein said differential molding device comprises a curved member having different curvatures on different portions and an actuation mechanism that moves said curved member and positions said different portions in contact with the dispensed material.

9. The system of claim 8, wherein said differential molding device is arranged to perform internal heating and cooling for temperature adjustment.

10. The system of claim 1, further comprising:
a base member for carrying the dispensed material, said base member comprising an internal heating and cooling means for adjusting temperatures of said base member and of the dispensed material on said base member; and
a mechanical movement system for generating a predetermined relative movement sequence between said dispensing head and said base member, said mechanical movement system comprising at least four degrees of freedom and thereby allowing said dispensing head to dispense the materials along tangential directions of surfaces of said three-dimensional article.

11. The system of claim 1, wherein
said first movable gating member adjusts the dimension of the first elongated exit opening by a rotation-plus-translation motion that moves an end of the first movable gating member along the first elongated exit opening; and
said first gating mechanism comprises a post that is located outside of the material cell but is rigidly connected to said first movable gating member by a joining structure, one end of the post being connected through a first rotatable joint to one end of a beam to form a two-bar linkage with the other end of the beam mounted to a second rotatable joint on a base frame, the other end of the post being connected to a shaft movable along a slot on the base frame.

12. The system of claim 11, wherein the volume of the material cell space is kept constant while the first movable gating member moves.

13. The system of claim 1, wherein said dispensing head comprises a second elongated exit opening and a second gating mechanism with a second gating member, the second elongated exit opening being orientated perpendicularly with respect to the first elongated exit opening, the two elongated exit openings being connected to each other externally and being connected to the material cell internally.

* * * * *